(12) United States Patent
Kinoshita et al.

(10) Patent No.: US 12,744,440 B2
(45) Date of Patent: Sep. 22, 2026

(54) VIBRATION ACTUATOR WITH MOVING COIL AND MOVING MAGNETIC ASSEMBLY HAVING ELASTIC PARTS

(71) Applicants: Yosuke Kinoshita, Tokyo (JP); Shigeyuki Shimomura, Tokyo (JP); Yoshihiro Maeda, Tokyo (JP); Shigenori Inamoto, Tokyo (JP); Chikara Sekiguchi, Tokyo (JP)

(72) Inventors: Yosuke Kinoshita, Tokyo (JP); Shigeyuki Shimomura, Tokyo (JP); Yoshihiro Maeda, Tokyo (JP); Shigenori Inamoto, Tokyo (JP); Chikara Sekiguchi, Tokyo (JP)

(73) Assignee: Minebea Mitsumi Inc., Nagano (JP)

( * ) Notice: Subject to any disclaimer, the term of this patent is extended or adjusted under 35 U.S.C. 154(b) by 257 days.

(21) Appl. No.: 18/681,089

(22) PCT Filed: Aug. 5, 2022

(86) PCT No.: PCT/JP2022/030075
§ 371 (c)(1),
(2) Date: Feb. 5, 2024

(87) PCT Pub. No.: WO2023/013761
PCT Pub. Date: Feb. 9, 2023

(65) Prior Publication Data

US 2025/0125701 A1 Apr. 17, 2025

(30) Foreign Application Priority Data

Aug. 6, 2021 (JP) ................................ 2021-129940

(51) Int. Cl.
*H02K 33/18* (2006.01)

(52) U.S. Cl.
CPC .................................. *H02K 33/18* (2013.01)

(58) Field of Classification Search
CPC ........ H02K 35/00; H02K 35/02; H02K 33/12; H02K 33/16; H02K 33/18; H02K 33/00;
(Continued)

(56) References Cited

U.S. PATENT DOCUMENTS 4,924,123 A * 5/1990 Hamajima ............ H02K 35/02 310/15
5,440,183 A * 8/1995 Denne .................. F15B 15/088 310/12.26

(Continued)

FOREIGN PATENT DOCUMENTS

CN 101045229 10/2007
CN 101944819 1/2011

(Continued)

OTHER PUBLICATIONS

Notification of Office Action and Search Report Dated Apr. 22, 2026 From The State Intellectual Property Office of People's Republic of China Re. Application No. 202280054180.4 and Its Translation Into English. (20 Pages).

*Primary Examiner* — Maged M Almawri

(57) ABSTRACT

This vibration actuator includes: a housing; a first movable part that has a magnet part and is disposed in such a manner as to be capable of reciprocating in a vibration direction that is along the axial direction, such reciprocation being within the housing and via a first elastic support part joined to both ends of the magnet part, the ends being separated in the axial direction of the magnet part; and a second movable part that has a coil part disposed to surround the magnet part, and that is disposed so as to be capable of reciprocating along the vibration direction at the outer periphery of the first movable part such reciprocation being within the housing and via a second elastic support part joined to both ends of the coil part, the ends being separated in the axial direction of the coil part.

12 Claims, 29 Drawing Sheets

(58) Field of Classification Search

CPC .... A43B 3/34; A43B 7/00; B06B 1/04; B06B 1/045

USPC ........................................................ 310/15–28

See application file for complete search history.

(56) References Cited

U.S. PATENT DOCUMENTS 5,973,422 A * 10/1999 Clamme ................ H02K 33/16 310/90.5
6,501,357 B2 * 12/2002 Petro .................. H01H 51/2209 335/229
7,078,832 B2 * 7/2006 Inagaki .................... H02K 7/14 335/238
7,791,456 B2 * 9/2010 Miura .................... H02K 33/16 340/407.1
7,859,144 B1 * 12/2010 Sahyoun ................ H02K 33/16 335/229
7,898,121 B2 * 3/2011 Ramsay ............... H02K 41/031 74/473.23
7,948,124 B1 * 5/2011 Waters ................... H02K 35/00 310/36
8,097,991 B2 * 1/2012 Masami ................. H02K 33/16 310/15
8,456,032 B2 * 6/2013 Hochberg ............... F03B 13/00 290/43
8,593,017 B2 * 11/2013 Stefanini ................ H02K 35/02 290/1 R
8,629,569 B2 * 1/2014 Roberts .................. H02K 35/02 290/1 R
8,643,228 B2 * 2/2014 Vogel ................. G02B 23/2476 310/12.24
9,906,109 B2 * 2/2018 Endo ...................... H02K 33/16
10,047,717 B1 * 8/2018 Phillips ................... F03B 13/20
10,170,969 B2 * 1/2019 Ohishi ................. H02K 7/1876
10,622,538 B2 * 4/2020 Zhang .................. H10N 30/802
11,031,857 B2 * 6/2021 Wasenczuk ............ H02N 2/186
11,152,843 B2 * 10/2021 Wasenczuk ............. H02K 1/34
11,658,555 B2 * 5/2023 Mori ...................... H02K 33/16 310/28
11,714,490 B2 * 8/2023 Kim ...................... H02P 25/032 345/173
11,831,214 B2 * 11/2023 Chiba ....................... B06B 1/14
11,843,298 B2 * 12/2023 Ando ..................... H02K 33/18
11,926,185 B2 * 3/2024 Yamazaki ............ B60G 17/017
11,943,599 B2 * 3/2024 Patsouras ............... H04R 11/14
11,973,389 B2 * 4/2024 Neubauer .............. H02K 33/16
2003/0034697 A1 * 2/2003 Goldner .................. F16F 15/03 310/15
2003/0197433 A1 * 10/2003 Cheung .................. H02K 35/02 310/156.01
2004/0119343 A1 * 6/2004 Ueda ........................ G10K 9/22 310/12.31
2006/0208600 A1 * 9/2006 Sahyoun ................ H02K 33/16 310/254.1
2007/0182257 A1 * 8/2007 Miura ...................... H04R 9/02 310/23
2008/0001484 A1 * 1/2008 Fuller .................... H02K 33/16 310/15
2009/0066168 A1 * 3/2009 Cardon .................. H02K 7/106 310/12.24
2010/0066182 A1 * 3/2010 Yamazaki ............... B06B 1/045 310/29
2011/0133577 A1 * 6/2011 Lee ........................ H02K 33/18 310/15
2011/0193426 A1 * 8/2011 Chung ................... H02K 33/16 310/25
2011/0198948 A1 * 8/2011 Keisuke ................. H02K 5/225 310/25
2011/0198949 A1 * 8/2011 Furuich .................. H02K 33/16 310/25
2011/0260559 A1 * 10/2011 Kanai ....................... B06B 1/16 310/25
2012/0212097 A1 * 8/2012 Wasenczuk ............... B06B 1/04 310/216.001
2013/0033129 A1 * 2/2013 Hong ...................... B06B 1/045 310/25
2013/0285479 A1 * 10/2013 Kinoshita ............. H02K 35/02 310/12.12
2013/0300219 A1 * 11/2013 Roberts .................... H02K 1/34 310/25
2013/0342032 A1 * 12/2013 Laurent .................. H02K 35/04 310/306
2014/0062225 A1 * 3/2014 Kim ....................... H02K 33/00 310/15
2014/0103751 A1 * 4/2014 Furukawa ............. H02K 35/02 310/25
2014/0117785 A1 5/2014 Furukawa et al.
2014/0132089 A1 * 5/2014 Jeon ....................... H02K 33/18 310/14
2014/0203669 A1 * 7/2014 Rios-Quesada ........ H02K 41/02 310/12.19
2014/0232211 A1 8/2014 Katada et al.
2014/0265651 A1 * 9/2014 Kim ....................... H02K 33/16 310/25
2015/0048694 A1 * 2/2015 Rios-Quesada ........ H02K 41/00 310/12.14
2015/0226197 A1 * 8/2015 Hahn .................... F04B 39/122 417/363
2016/0236162 A1 * 8/2016 Lucon ..................... B06B 1/045
2016/0252071 A1 * 9/2016 Phillips ................. H02M 7/066 290/50
2017/0070131 A1 * 3/2017 Degner .................. H02K 33/00
2017/0198401 A1 * 7/2017 Phillips ..................... C25B 9/65
2017/0288523 A1 * 10/2017 Katada .................. H02P 25/032
2017/0366077 A1 * 12/2017 Oonishi .................. H02J 50/00
2019/0207496 A1 * 7/2019 Takahashi .............. H02K 33/02
2020/0274432 A1 * 8/2020 Wauke ................... H02K 33/06
2020/0389078 A1 12/2020 Takahashi et al.
2021/0028679 A1 * 1/2021 Wasenczuk ............ H02K 35/02
2021/0328491 A1 * 10/2021 Takahashi ............... B06B 1/045
2022/0085709 A1 * 3/2022 Oonishi .................. B06B 1/045
2023/0074890 A1 * 3/2023 Muniraju ............... H10N 10/13
2023/0101894 A1 * 3/2023 Takahashi ................. B06B 1/04 310/81
2023/0361662 A1 * 11/2023 Takahashi .............. H02K 33/02

FOREIGN PATENT DOCUMENTS

| | | |
|---|---|---|
| CN | 101971469 | 2/2011 |
| CN | 103731003 | 4/2014 |
| CN | 103997181 | 8/2014 |
| CN | 112054645 | 12/2020 |
| KR | 10-2144888 | 8/2020 |

* cited by examiner

1

VIBRATION ACTUATOR WITH MOVING COIL AND MOVING MAGNETIC ASSEMBLY HAVING ELASTIC PARTS

TECHNICAL FIELD

The present invention relates to a vibration actuator.

BACKGROUND ART

In the related art, a vibration actuator is mounted as a vibration generation source in electronic apparatuses having vibration functions. The electronic apparatuses can provide stimulation, notify users of incoming calls, and improve the sense of operation and presence by driving vibration actuators to transmit vibrations to users and make them experience them. The electronic apparatuses are mainly hand-held electrical apparatuses, including portable game terminals, controllers (gamepads) of stationary game machines, portable communication terminals such as cell phones and smartphones, and portable information terminals such as tablet PCs. Vibration actuators may also be implemented in wearable apparatuses worn on clothing, arms, etc.

As a vibration actuator with a miniaturizable structure to be mounted in portable apparatuses, an actuator with a linear reciprocating mechanism is known, for example, as shown in PTL 1.

This actuator includes a core on the front and back surfaces of a magnet, a movable part with a shaft inserted and fixed in the front and back directions of the magnet, and a fixed part with a coil and a yoke that houses the movable part. The coil is arranged to surround the movable part, and a plate spring is provided between the both ends of the shaft and the yoke to support the movable part such that the movable part is movable in the axial direction of the shaft. When the coil is energized, the movable part with the shaft moves in a linear reciprocating motion and generates vibration.

CITATION LIST

Patent Literature

PTL1
Chinese Patent No. 101944819

SUMMARY OF INVENTION

Technical Problem

Incidentally, in known vibration actuators, there is a desire to generate various types of vibrations to express various vibrations as the tactile sensation to be given, while reducing the size of the actuator.

An object of the present invention is to provide a vibration actuator that stably generates various vibration outputs with different frequency bands while reducing the size of the actuator.

Solution to Problem

A vibration actuator according to an aspect of the present invention includes: a housing; a first movable part including a magnet part, and disposed in a movable manner back and forth in a vibration direction along an axis direction in the housing through a first elastic support part joined at both end portions of the magnet part in an axis direction; and a second movable part including a coil part disposed coaxially with the magnet part so as to surround the magnet part, the second movable being disposed in a movable manner back and forth in the vibration direction in the housing at an outer periphery of the first movable part through a second elastic support part joined at both end portions of the coil part in the axis direction. Vibration is generated by driving the first movable part and the second movable part through energization to the coil part.

Advantageous Effects of Invention

According to the present invention, it is possible to stably generate various vibration outputs with different frequency bands while reducing the size of the actuator.

DESCRIPTION OF EMBODIMENTS

Embodiments of the present invention are elaborated below with reference to the accompanying drawings.

Embodiment 1

General Configuration of Vibration Actuator

Figure 1:
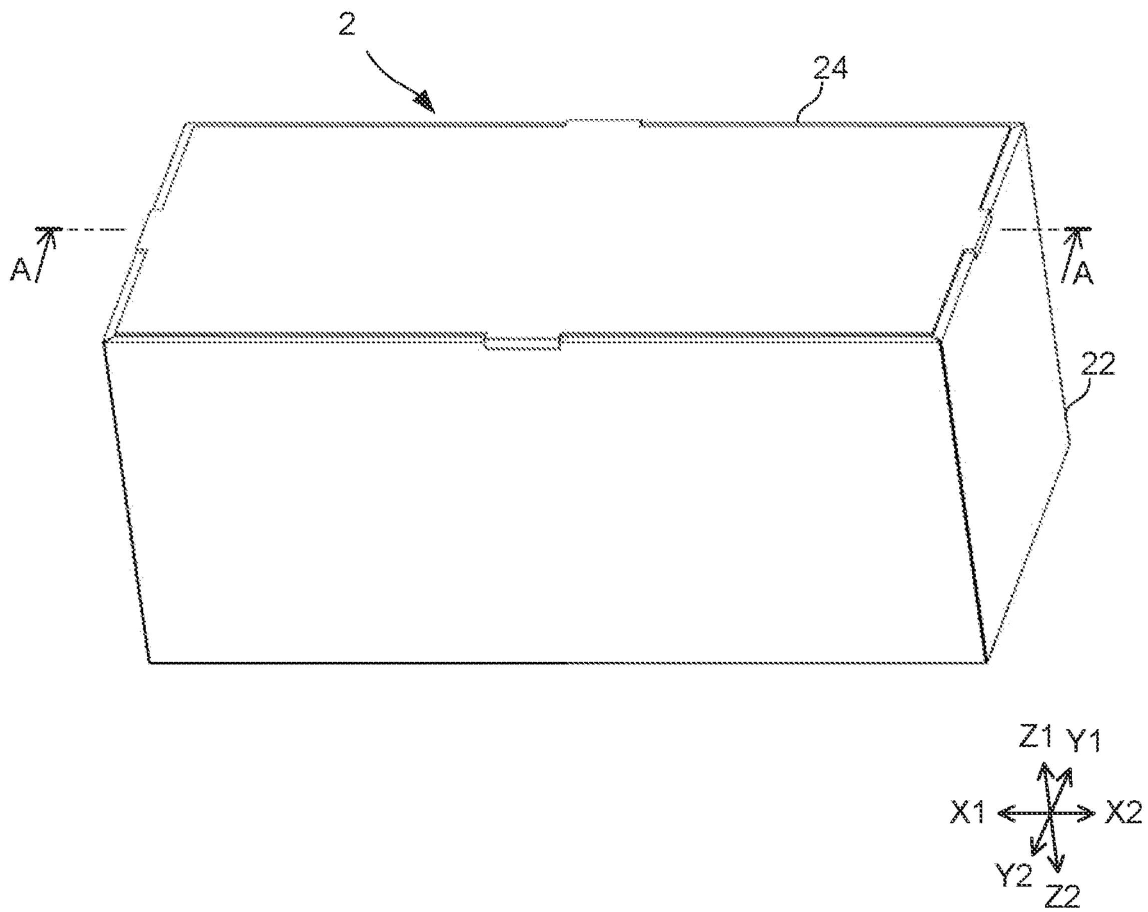
FIG. 1 is a perspective view of an external appearance of a vibration actuator according to Embodiment 1 of the present invention.
Figure 2:
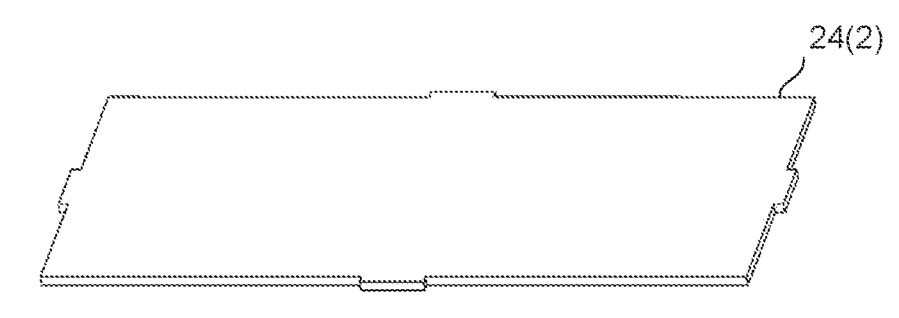
FIG. 2 is an exploded view illustrating a configuration of a main part of the vibration actuator according to Embodiment 1 of the present invention.
Figure 2:
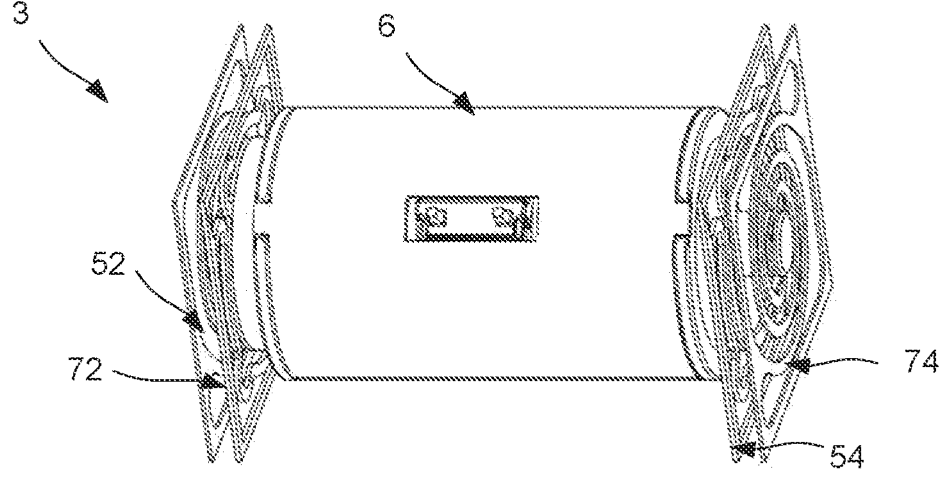
Figure 2:
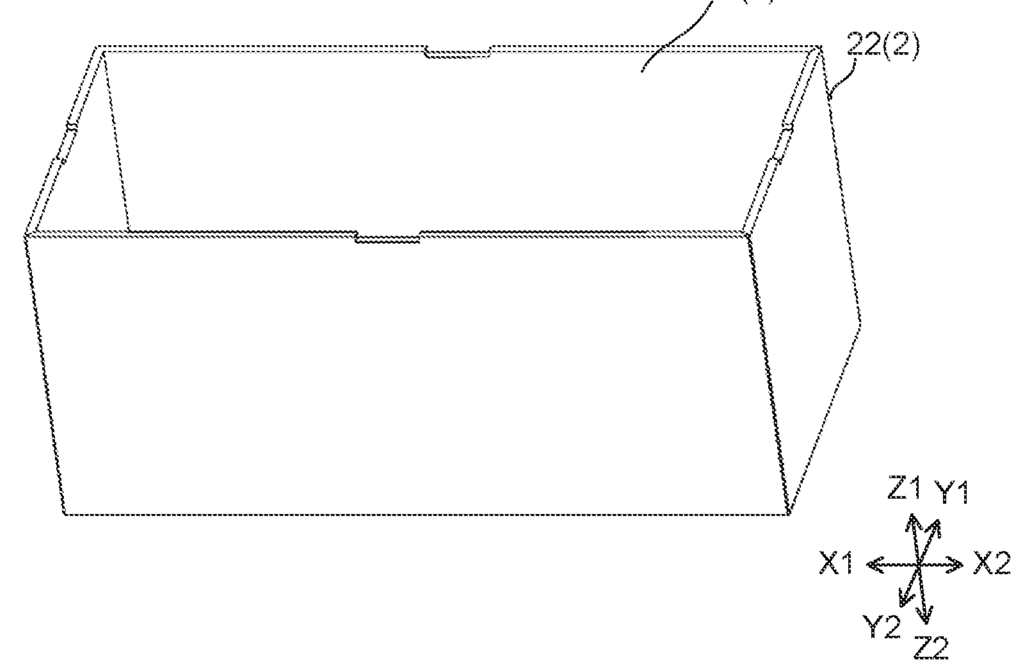

FIG. 1 is a perspective view of an external appearance of a vibration actuator according to Embodiment 1 of the present invention, and FIG. 2 is an exploded view illustrating a configuration of a main part of the vibration actuator according to Embodiment 1 of the present invention.

Figure 3:
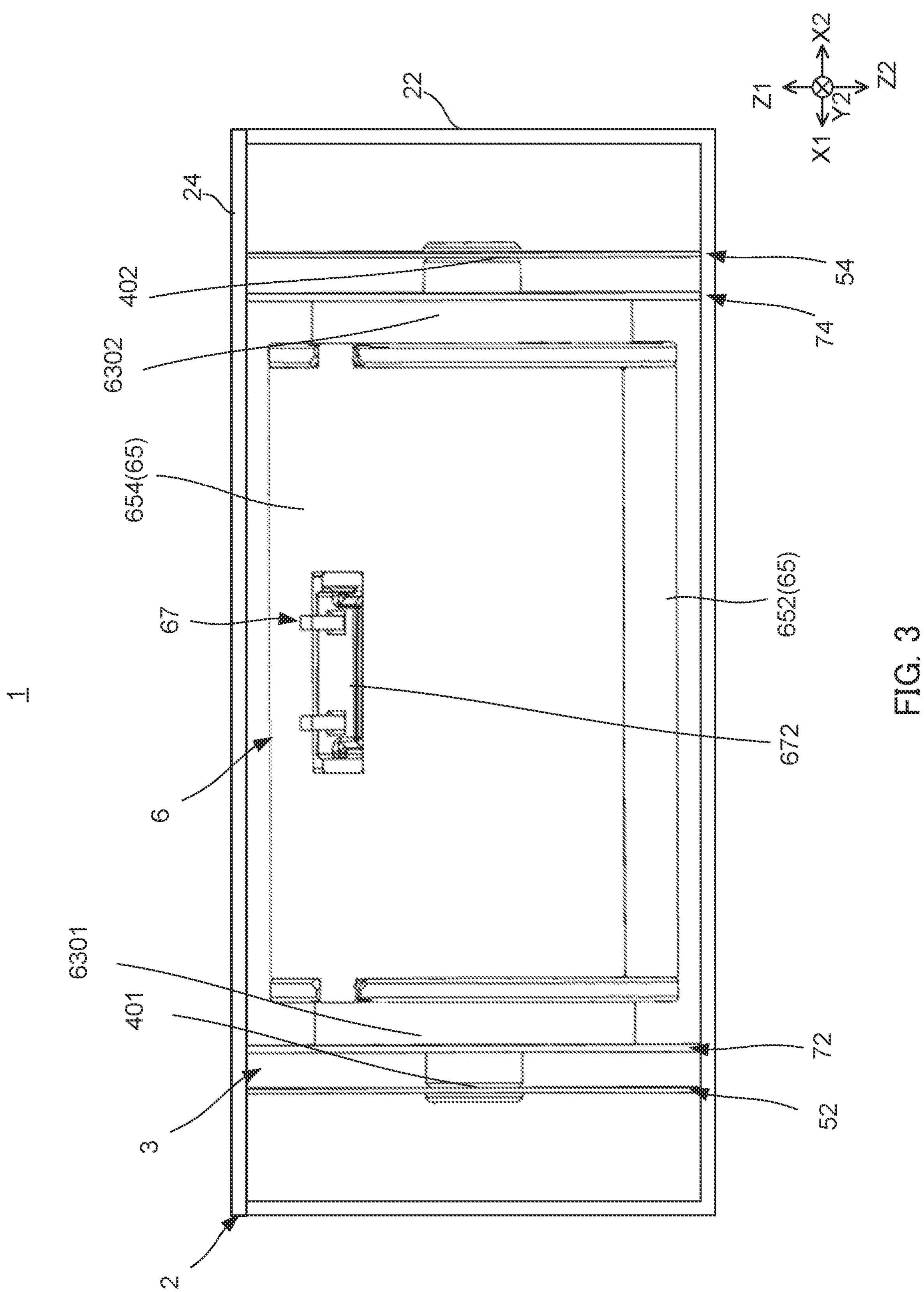
FIG. 3 is a front view illustrating a configuration of a main part of the vibration actuator according to Embodiment 1 of the present invention.
Figure 4:
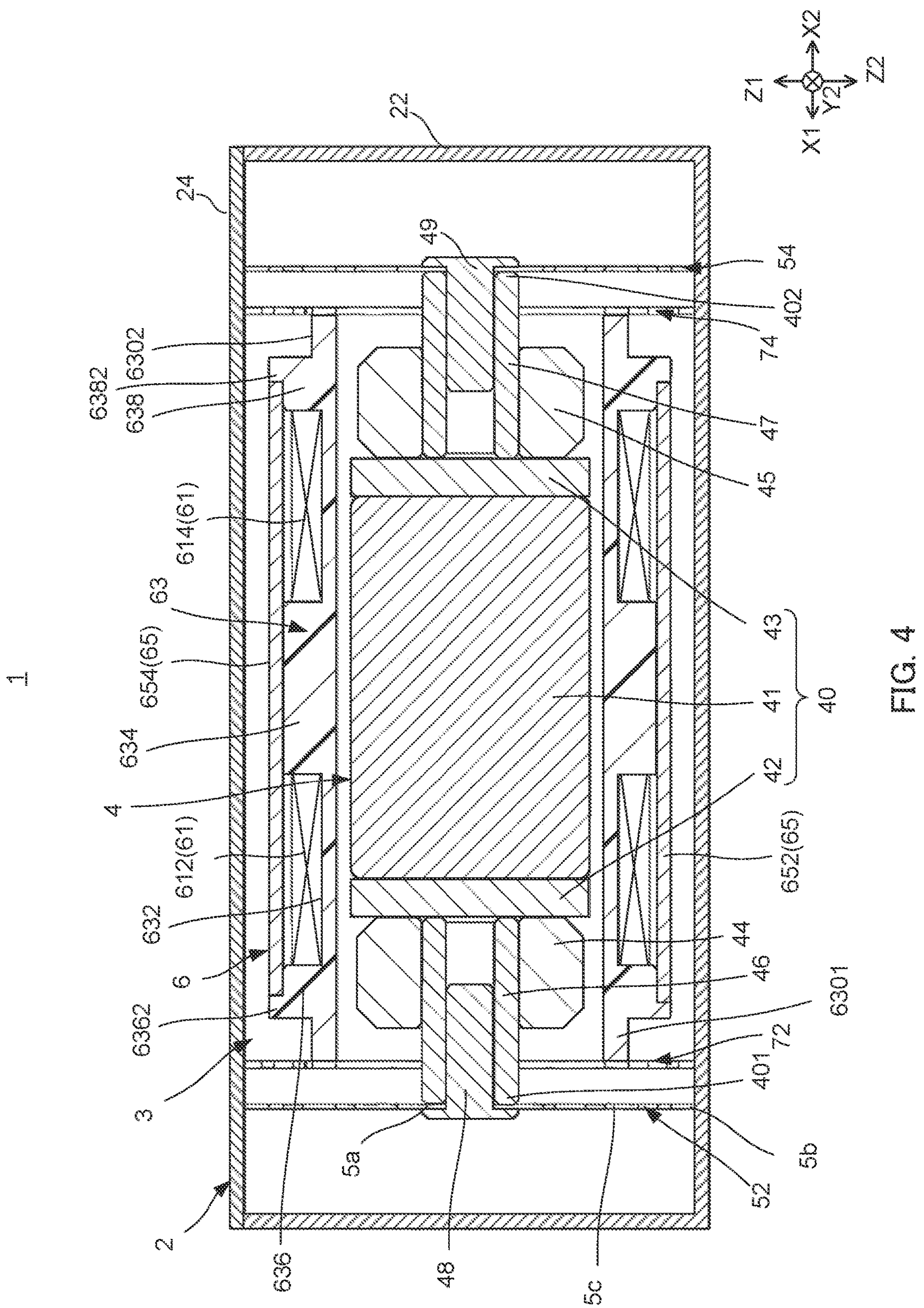
FIG. 4 is a sectional view taken along line A-A of FIG. 1.

FIG. 3 is a front view illustrating a configuration of a main part of the vibration actuator according to Embodiment 1 of the present invention, and FIG. 4 is a sectional view taken along line A-A of FIG. 1. Note that for the sake of clarity, the Z1 direction and the Z2 direction in the present embodiment are referred to as “upper” side and “lower” side, and these directions are collectively referred to as the “Z direction”, for example. The X1 direction and the X2 direction are referred to as “left” side and “right” side, which are one side and the other side of the vibration direction of a movable member of a vibration actuator, and these directions are collectively referred to as “X direction”. The Y1 direction and the Y2 direction are referred to as “front” side and “rear” side, and these directions are collectively referred to as “Y direction”.

Vibration actuator 1 is mounted as a vibration generation source in electric equipment including an electronic apparatus such as a mobile game terminal apparatus, to achieve the vibration function of the electric equipment. This electric equipment includes mobile apparatuses such as tablets and smartphones. Vibration actuator 1 is mounted in apparatuses such as mobile game terminal apparatuses and mobile apparatuses, and vibrates, for example, to give a desired tactile sensation, to notify the user of an incoming call, or to give a sense of operation or presence, for example. Vibration actuator 1 of the present embodiment can generate stronger vibration than vibration actuators with one vibration system. In addition, vibration actuator 1 of the present embodiment has a basic structure that can generate vibration of a desired frequency band in low to high frequency ranges, for example.

As illustrated in FIG. 1, vibration actuator 1 is a vibrating member including housing 2 with a cuboid shape.

FIG. 3 is a front view illustrating a structure of a main part of the vibration actuator, and FIG. 4 is a sectional view taken along line A-A of FIG. 1, and a longitudinal sectional view illustrating a configuration of a main part of the vibration actuator. As illustrated in FIGS. 2 to 5, vibration actuator 1 includes housing 2, and driving unit 3 housed in housing 2. Driving unit 3 includes first movable part 4, second movable part 6, first elastic support parts 52 and 54, and second elastic support parts 72 and 74.

Housing 2

Housing 2 houses vibration unit 3, and includes box-shaped housing body 22 and plate part 24. Housing 2 is formed in a cuboid shape so as to be easily mounted to the electric equipment at the outer flat surface, but this is not limitative, and, it may be formed in a columnar shape or a prismatic shape.

In housing 2, first movable part 4 is disposed in a movable manner in the vibration direction (corresponding to the X direction in the present embodiment) through first elastic support parts 52 and 54, and second movable part 6 is disposed in a movable manner in the vibration direction through second elastic support parts 72 and 74. Note that first movable part 4 and first elastic support parts 52 and 54 are included in a first vibration system, and second movable part 6 and second elastic support parts 72 and 74 are included in a second vibration system.

As illustrated in FIGS. 1 to 4, housing 2 houses driving unit 3 by closing opening 26 (see FIG. 2) of bottomed cylindrical housing body 22 with plate part (lid part) 24.

When first movable part 4 and second movable part 6 of driving unit 3 are driven in vibration actuator 1, vibration actuator 1 itself functions as a vibrating member.

Figure 5:
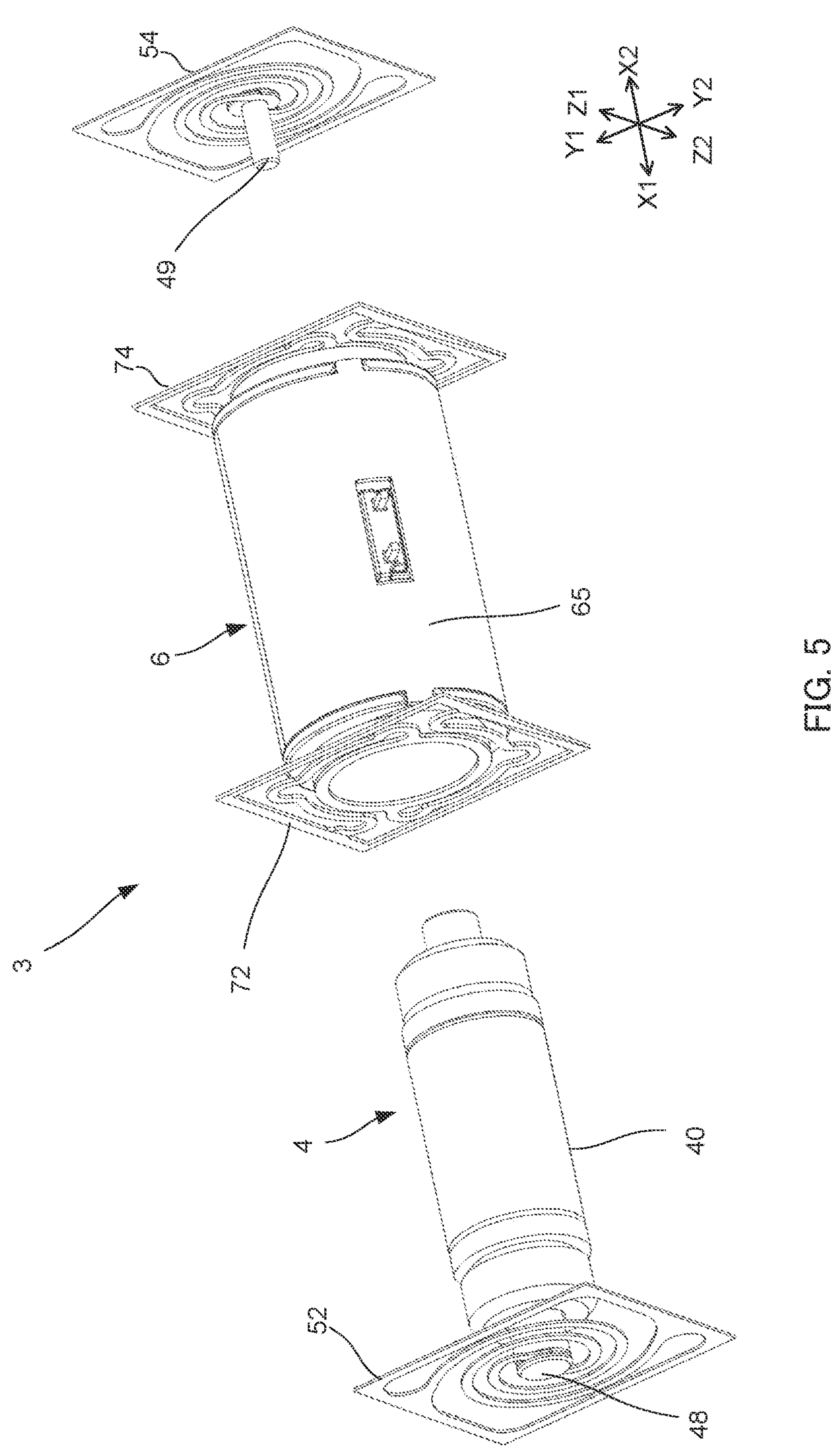
FIG. 5 is an exploded view of a driving unit of the vibration actuator according to Embodiment 1 of the present invention.

Vibration unit 3 includes first movable part 4 including magnet part 40, first elastic support parts 52 and 54, second movable part 6 including coil part 61 disposed at the outer periphery of magnet part 40, and second elastic support parts 72 and 74. As illustrated in FIG. 5, first movable part 4 is disposed inside second movable part 6, and second movable part 6 is movable in the vibration direction at the outer periphery of first movable part 4, for example.

First movable part 4 is disposed in a movable manner back and forth in the vibration direction in housing 2 through first elastic support parts 52 and 54 joined to both end portions 401 and 402 of the magnet part 40 in the vibration direction extending in the axis direction.

On the other hand, second movable part 6 is disposed in a movable manner back and forth in the vibration direction in housing 2 at the outer periphery of first movable part 4 through second elastic support parts 72 and 74 joined at both end portions 6301 and 6302 of coil part 61 in the axis direction. Note that first movable part 4 and second movable part 6 are supported in a symmetric manner in the vibration direction by first elastic support parts 52 and 54 and second elastic support parts 72 and 74 on both sides in the vibration direction. In this manner, unlike a configuration in which they are supported on one side by the elastic support part, first movable part 4 and second movable part 6 can be located at the center in the vibration direction without shifting the vibration axis of first movable part 4 and second movable part 6 to one side. Thus, even in the case where the amplitudes of first movable part 4 and second movable part 6 are increased, or the weights of first movable part 4 and second movable part 6 are increased, they can be favorably supported in a movable manner back and forth in the vibration direction.

In driving unit 3, first movable part 4 and second movable part 6 are disposed in housing 2 in a movable manner in the vibration direction, i.e., the X (X1 and X2) direction. Driving unit 3 generates vibration by driving first movable part 4 and second movable part 6 through cooperation of energized coil part 61 (a pair of coils 612 and 614) and magnet part 40 (magnet 41, yokes 42 and 43).

More specifically, first movable part 4 and second movable part 6 are mechanically independently supported by housing 2 through first elastic support parts 52 and 54 and second elastic support parts 72 and 74, and are not mechanically connected with each other. However, when coil part 61 is energized, magnet part 40 provided with first movable part 4 moves, and second movable part 6 provided with coil part 61 also moves to follow that movement through mutual electromagnetic operation of magnet part 40 and coil part 61 relatively supported. That is, while first movable part 4 and second movable part 6 are not mechanically connected with each other, first movable part 4 and second movable part 6 move back and forth in the vibration direction through energization to coil part 61.

Figure 11:
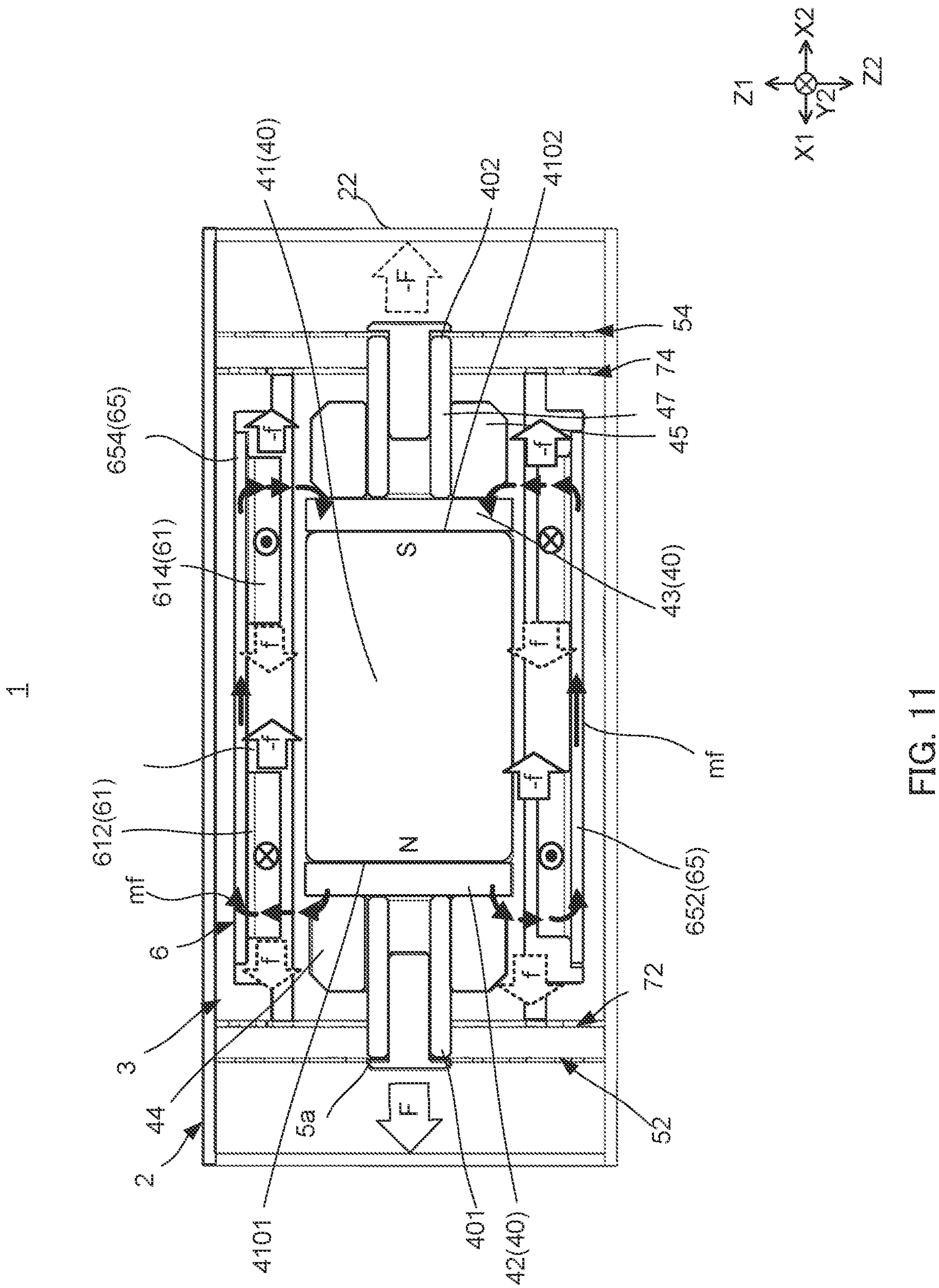
FIG. 11 is a diagram schematically illustrating a configuration of a magnetic circuit of the vibration actuator according to Embodiment 1 of the present invention.

Configurations of first movable part 4 and second movable part 6 are described below. Note that unless otherwise noted, in the following description of the relative positional relationship of the component of first movable part 4 and the component of second movable part 6, it is assumed that first movable part 4 and second movable part 6 are located at the amplitude zero position in the vibration direction as illustrated in FIGS. 3, 4, and 11, for example. The same applies to other embodiments and modifications described later.

First Movable Part 4

First movable part 4 is held in a movable manner in the vibration direction (the X direction) in the state of being suspended through first elastic support parts 52 and 54 on both sides in the X direction in housing 2, for example.

Figure 6:
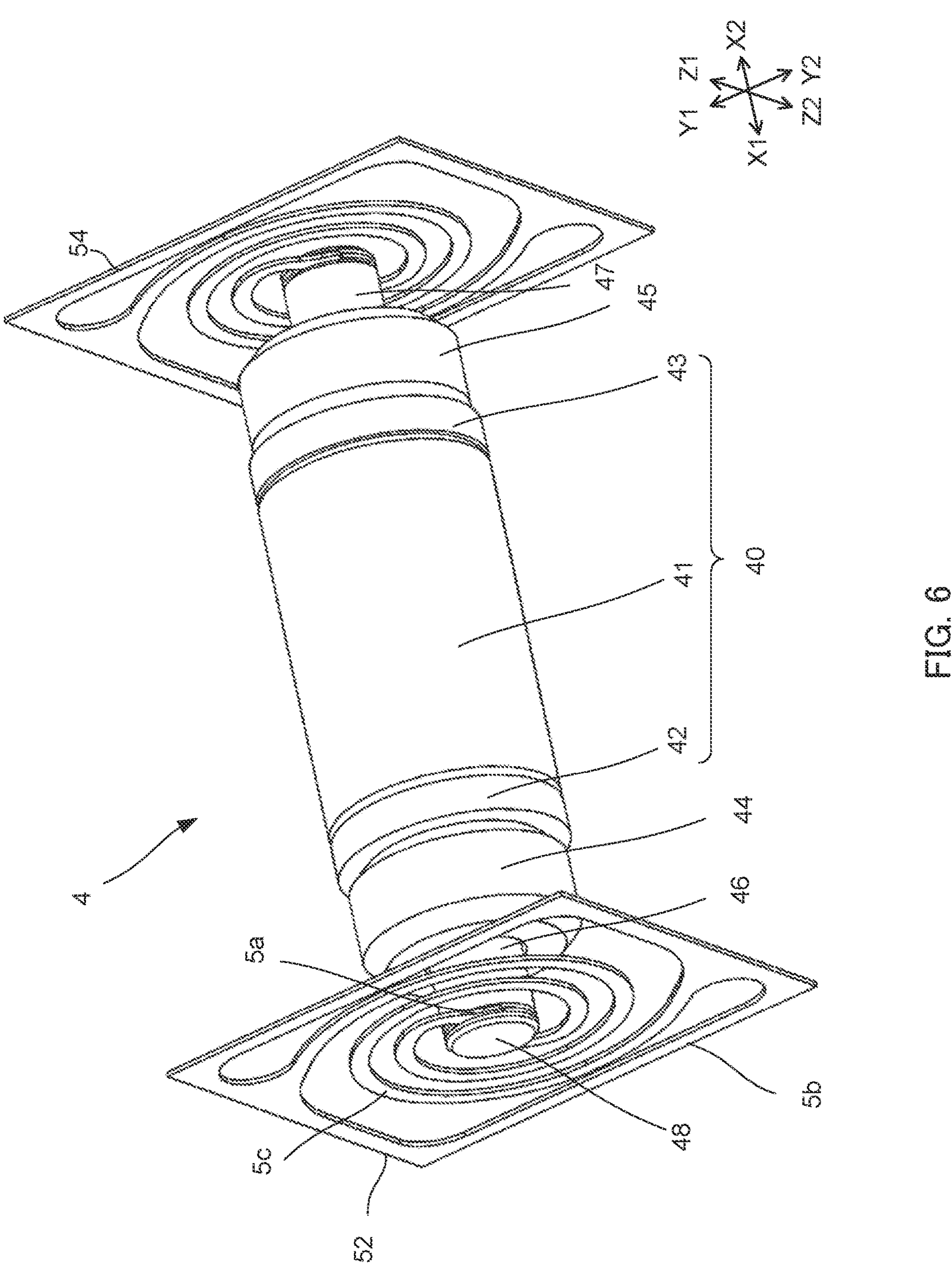
FIG. 6 is a perspective view illustrating a first movable part of the vibration actuator according to Embodiment 1 of the present invention.
Figure 7:
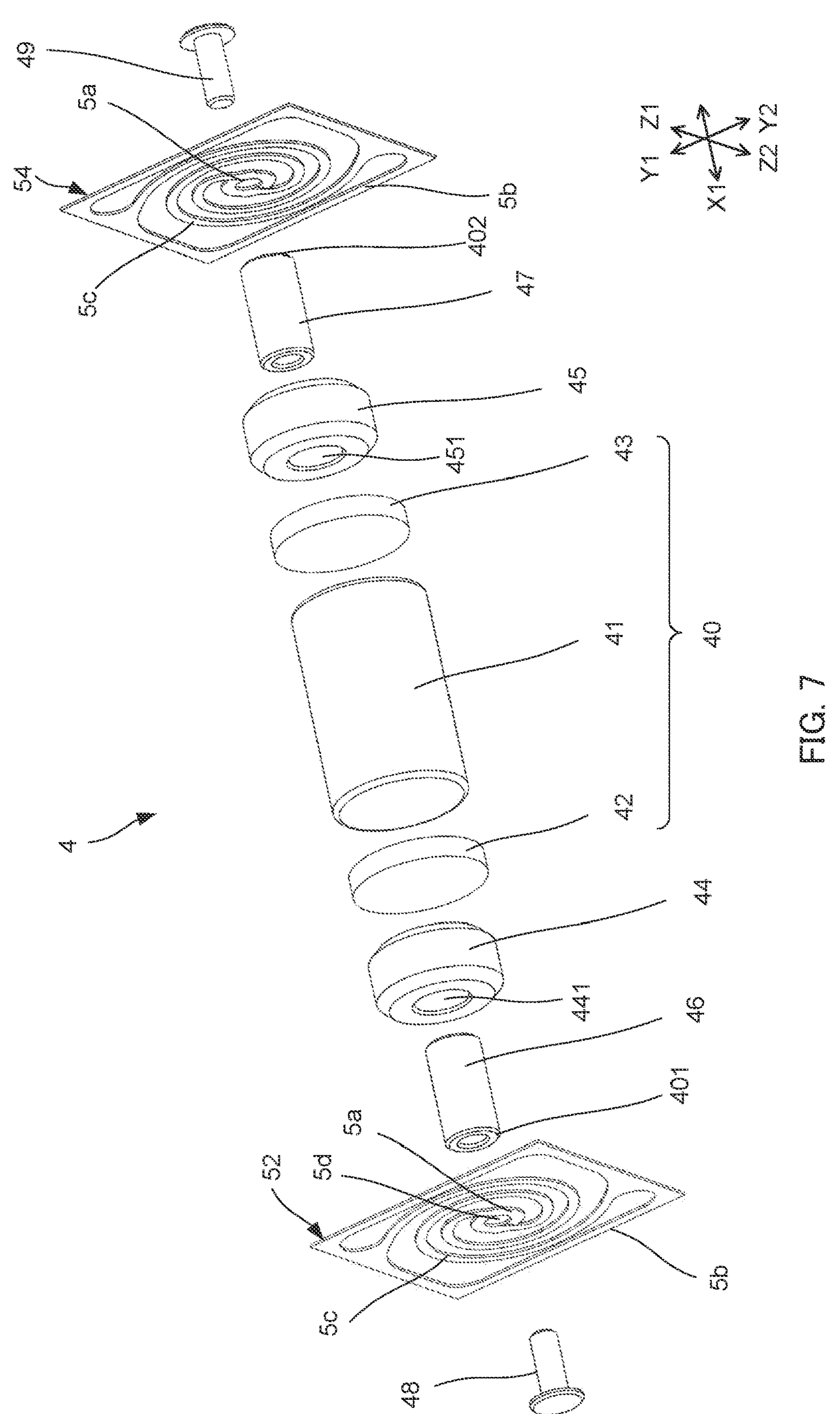
FIG. 7 is an exploded perspective view of the first movable part of the vibration actuator according to Embodiment 1 of the present invention.

FIG. 6 is a perspective view illustrating first movable part 4 of the vibration actuator, and FIG. 7 is an exploded perspective view of first movable part 4 of the vibration actuator. First movable part 4 illustrated in FIGS. 6 and 7 includes magnet part 40, weight parts 44 and 45, sleeves 46 and 47 serving as a spring stopper part, and spring fixing parts 48 and 49. Magnet part 40 is magnetized in the X direction, and the end surfaces in the vibration direction are magnetic pole surfaces with different polarities. Magnet part 40 includes magnet 41, and yokes 42 and 43 disposed at both end portions (front and rear surfaces 4101 and 4102 in FIG. 11) of magnet 41, for example.

Magnet 41 has a solid columnar shape (including a plate shape) magnetized in the axis direction (the vibration direction) (see FIG. 11). That is, the magnetization direction of magnet 41 corresponds to the axis direction and the vibration direction. In the present embodiment, magnet 41 is formed in a columnar shape (which may be referred to as a disk-shape) with the length (height) in the vibration direction longer than the diameter (width). Magnet 41 is composed of a neodymium sintering magnet or the like, for example. Magnet 41 is disposed at the center portion in the vibration direction in magnet part 40, and yokes 42 and 43 are fixed at its both end portions.

Magnet part 40 is disposed to face the center portion of coil part 61 (the pair of coils 612 and 614) in the axis direction with a spacing therebetween inside coil part 61 (the pair of coils 612 and 614; details are described later) of second movable part 6. Here, the "radial direction" is also a direction orthogonal to the axis direction of coil part 61 (the pair of coils 612 and 614). Magnet part 40 is disposed to face the center of the inner peripheral surface of coil holding part 63 in the vibration direction, on the outside of the radial direction of magnet part 40.

The "spacing" in the radial direction is a spacing between magnet part 40 and cylindrical body part 632 disposed radially inside coil part 61 in coil holding part 63 at the amplitude zero position, and is a spacing with which they do not make contact with each other even in the driving state.

Magnet 41 may have a shape other than the solid columnar shape such as a cylindrical shape and a plate shape as long as it is disposed with the two magnetization surfaces facing the extending direction of the axis of coil part 61, i.e., the vibration direction, inside coil part 61. With a solid shape, stronger magnetic force can be provided in comparison with a cylindrical shape. In addition, it is desirable that in the state where first movable part 4 and second movable part 6 be located at the amplitude zero position, the center of magnet 41 in the axis direction coincides with the center of the axis direction of first movable part 4 and second movable part 6.

Yokes 42 and 43 are magnetic substances, and are fixed to both end surfaces of magnet 41. Note that yokes 42 and 43 are symmetrically provided at magnet 41 with magnet 41 sandwiched at the center therebetween. Yokes 42 and 43 may be firmly fixed to magnet 41 by being attracted by magnet 41, or may be fixed to magnet 41 with heat curable adhesive such as epoxy resin or anaerobic adhesive, for example. In the present embodiment, they are formed in a disk shape with the same diameter as that of magnet 41 because magnet 41 has a cylindrical shape. Yokes 42 and 43 make up the magnetic circuit of vibration actuator 1 together with magnet 41, the outer yoke (described later) and coil part 61 (the pair of coils 612 and 614) of second movable part 6.

Yokes 42 and 43 effectively distribute the magnetic flux flowing between magnet 41 and coil part 61 (the pair of coils 612 and 614) by focusing the magnetic flux of magnet 41 so as to carry it with no leakage. Yokes 42 and 43 are formed of a SECC (electro-galvanized steel sheet) or the like, for example.

Further, in addition to the function as a part of the magnetic circuit, yokes 42 and 43 may have a function as the body portion of the movable member together with magnet 41 in the movable member, and a function as a positioning part for fixing weight parts 44 and 45, and a function as a weight. Yokes 42 and 43 fix magnet part 40 to weight parts 44 and 45 and sleeves 46 and 47.

Weight Parts 44 and 45

Weight parts 44 and 45 are fixed to the respective outer surfaces of yokes 42 and 43 in the vibration direction. Weight parts 44 and 45 are symmetrically disposed in the vibration direction so as to sandwich magnet part 40 in the vibration direction, and increase the vibration output of first movable part 4. Weight parts 44 and 45 have outer peripheral surfaces with the same diameter as that of yokes 42 and 43, i.e., magnet part 40, and are formed in an annular shape. Center through holes (openings) 441 and 451 of weight parts 44 and 45 have the same axial center as magnet part 40, and have the same diameter, but they may have different diameters. Sleeves (spring stopper parts) 46 and 47 are inserted and joined to through holes (openings) 441 and 451.

Weight parts 44 and 45 function as weights in first movable part 4, and serve a function of fixing and positioning sleeves 46 and 47 with respect to magnet 41. Weight parts 44 and 45 may be fixed to magnet 41 with heat curable adhesive such as epoxy resin or anaerobic adhesive. Weight parts 44 and 45 may be composed of a non-magnetic substance. In this manner, a compact magnetic circuit can be formed by suppressing the expansion of the configuration of the magnetic circuit of vibration actuator 1. In addition, since weight parts 44 and 45 are composed of a non-magnetic substance that does not affect the size of the magnetic circuit, the design flexibility of weight parts 44 and 45 can be increased in view of achieving the desired vibration characteristics for first movable part 4 and second movable part 6.

Preferably, weight parts 44 and 45 are composed of a material with high specific gravity, for example. Preferably, weight parts 44 and 45 are formed of a material with a specific gravity (for example, a specific gravity of about 16 to 19 $g/cm^3$) higher than that of a material such as a silicon steel sheet (the specific gravity of a steel sheet is, for example, 7.70 to 7.98 $g/cm^3$). Weight parts 44 and 45 are formed of a material with a specific gravity higher than that of yokes 42 and 43, and are formed of tungsten (with a specific gravity of, for example, 19.3 $g/cm^3$) or the like, for example. In this manner, even in the case where the external dimension of first movable part 4 are set in the design and the like, the mass of first movable part 4 can be relatively easily increased, and thus the desired vibration output achieving sufficient sensory vibration for the user can be achieved. Note that the mass of weight parts 44 and 45 may be changed in accordance with the desired vibration output of the first movable part.

Note that the outer diameter of weight parts 44 and 45 is equal to or smaller than the outer diameter of yokes 42 and 43. With a small diameter, they less make contact with first elastic support parts 52 and 54 when first movable part 4 vibrates in comparison with the case with the same diameter, and thus they can favorably vibrate. In this manner, a high vibration output can be ensured while reducing the size of vibration actuator 1.

Sleeves (Spring Stopper Parts) 46 and 47

The sleeve connects first movable part 4 (i.e., magnet part 40 and weight parts 44 and 45) to first elastic support parts 52 and 54.

Sleeves 46 and 47 make up end portions on both sides in the vibration direction in first movable part 4, i.e., separate end portions on both sides of magnet part 40 in the vibration direction.

In the present embodiment, sleeves 46 and 47 have a cylindrical shape (which may be a rod shape such as a columnar shape) disposed along the central axis of first movable part 4, and are interposed between yokes 42 and 43 and first elastic support parts 52 and 54.

One end portions of sleeves 46 and 47 are inserted to weight parts 44 and 45 so as to be protruded from the center portions of both end surfaces at yokes 42 and 43, respectively. Sleeves 46 and 47 are fixed to weight parts 44 and 45, respectively on one end portion sides. Sleeves 46 and 47 may be further fixed to yokes 42 and 43.

Specifically, sleeves 46 and 47 are disposed to protrude to the outside of second movable part 6 in the vibration direction to make up both end portions 401 and 402 of first movable part 4, and are joined to first elastic support parts 52 and 54, respectively. In this manner, both end portions 401 and 402 of first movable part 4 protrude to the outside of both end portions 6301 and 6302, respectively, of second movable part 6 in the vibration direction from both sides of magnet part 40 in the axis direction.

Sleeves 46 and 47 are joined to first elastic support parts 52 and 54 through spring fixing parts 48 and 49 such as rivets.

In vibration actuator 1, sleeves 46 and 47 are disposed to protrude outward from second elastic support parts 72 and 74 in the vibration direction such that first elastic support parts 52 and 54 and second elastic support parts 72 and 74 are located at separated positions in the vibration direction, i.e., located at positions where they do not overlap regardless of the amplitude positions of first elastic support parts 52 and 54 and second elastic support parts 72 and 74.

Note that sleeves 46 and 47 may be connected to yokes 42 and 43 and weight parts 44 and 45 by bonding with heat curable adhesive such as epoxy resin or anaerobic adhesive, or by bonding alone, or, by a combination of welding, bonding and caulking, for example. In addition, sleeves 46 and 47 are in contact with yokes 42 and 43 at one end portions, but they may not be in contact with yokes 42 and 43 at one end portions. Further, in the case where sleeves 46 and 47 are provided with a function as a weight by providing a weight in sleeves 46 and 47, the vibration output of vibration actuator 1 can be adjusted by adjusting the mass together with weight parts 44 and 45.

In addition, sleeves 46 and 47 and first elastic support parts 52 and 54 are fixed by using a rivet as spring fixing parts 48 and 49, but they may be fixed by using adhesive.

Sleeves 46 and 47 are joined to the inner periphery of first elastic support parts 52 and 54, and first movable part 4 is movable back and forth in the vibration direction with respect to the outer periphery of first elastic support parts 52 and 54 through deformation of first elastic support parts 52 and 54. Note that sleeves 46 and 47 are formed of a copper sintered material, for example.

In addition, sleeves 46 and 47 are disposed at a position outside the magnetic circuit including magnet part 40 in first movable part 4, coil part 61, and outer yoke 65. In this manner, in particular, the installation space of coil part 61 is not limited, i.e., the distance between the magnetic circuit (magnet part 40) of the movable member and coil part 61 is not increased, and thus, the electromagnetic conversion efficiency is not reduced. Thus, the weight of first movable part 4 can be favorably increased, and the high vibration output can be achieved.

First Elastic Support Parts 52 and 54

As illustrated in FIGS. 2 to 7, first elastic support parts 52 and 54 support first movable part 4 in a movable manner back and forth with respect to housing 2 in the vibration direction.

First elastic support parts 52 and 54 are provided to intersect the vibration direction over first movable part 4 and the peripheral wall of housing 2 with first movable part 4 sandwiched therebetween in the vibration direction of first movable part 4.

In the present embodiment, first elastic support parts 52 and 54 are parallel to each other across peripheral wall 3 over the axis of housing 2 and both end portions 401 and 402 of first movable part 4 as illustrated in FIG. 7.

First elastic support parts 52 and 54 are formed in a rectangular plate shape (for example, a square shape), and has a shape in which annular inner periphery part 5*a* as the inner spring end portion and frame-shaped outer periphery part 5*b* as the outer spring end portion are joined by elastically deformable deformation arm 5*c* with an arc-shape in plan view.

Deformation arm 5*c* is formed in a spiral shape so as to connect inner periphery part 5*a* and outer periphery part 5*b*, and ensure the length for elastic deformation. When deformation arm 5*c* is deformed, inner periphery part 5*a* and outer periphery part 5*b* are relatively displaced in the axis direction (the vibration direction).

First elastic support parts 52 and 54 support first movable part 4 such that first movable part 4 is movable in the axis direction (the vibration direction) without making contact with housing 2 and second movable part 6 regardless of whether second movable part 6 is moving.

First elastic support parts 52 and 54 may be composed of two or more spring members (for example, leaf springs) for first movable part 4. The plurality of leaf springs are attached along the direction orthogonal to the vibration direction.

Note that with first elastic support parts 52 and 54, first movable part 4 does not make contact with the pair of coils 612 and 614 by making contact with the inner peripheral surface of cylindrical body part 632 (see FIG. 10) even when first movable part 4 is being driven (vibrating) or when an external impact is received. Thus, coils 612 and 614 are not damaged.

In addition, first elastic support parts 52 and 54 are not limited as long as first movable part 4 is elastically supported in a movable manner back and forth. In the present embodiment, first elastic support parts 52 and 54 are the same member with the same configuration.

Inner periphery part 5*a* includes connection hole 5*d* disposed at a center of first elastic support parts 52 and 54. Both end portions 401 and 402 (sleeves 46 and 47) in the vibration direction in first movable part 4 are fit and connected to connection hole 5*d*. Inner periphery part 5*a* is disposed in the direction orthogonal to the protruding direction of sleeves 46 and 47, and sandwiched and fixed by both end portions 401 and 402 and spring fixing parts 48 and 49.

On the other hand, outer periphery part 5*b* is fixed to the peripheral walls around the X direction axis as the vibration direction in housing 2 so as to be orthogonal to the vibration direction. Outer periphery part 5*b* is bonded to housing 2 with adhesive or the like, for example.

The spring member as first elastic support parts 52 and 54 may be formed of any material as long as the material is elastically deformable, and may be formed by processing a sheet metal by using a stainless-steel sheet, a phosphor bronze or the like. In the present embodiment, first elastic support parts 52 and 54 are a thin, flat, rectangular leaf spring with an inner spiral part formed of phosphor bronze with high workability, excellent corrosion resistance, high tensile strength and wear resistance. In addition, when a non-magnetic substance such as phosphor bronze is used, the magnetic flux flow of the magnetic circuit is not disturbed at all. First elastic support parts 52 and 54 may be formed of resin as long as first movable part 4 is supported such that first movable part 4 can be vibrated. In addition, since first elastic support parts 52 and 54 have a plate shape, improvement of the positional accuracy, i.e., improvement of the processing accuracy can be achieved in comparison with a cone-shaped spring.

In the present embodiment, first elastic support parts 52 and 54 are joined to first movable part 4 and housing 2 in the postures that set the same spiral direction. Thus, even when the movement amount of first movable part 4 increases and first movable part 4 moves in the translation direction (here, the direction along the plane perpendicular to the vibration direction; the radial direction) while rotating, albeit slightly, first elastic support parts 52 and 54 rotate in the same direction at both end portions of first movable part 4. That is, first elastic support parts 52 and 54 do not interfere with mutual rotations by rotating in different directions unlike the case with opposite spiral directions, at both end portions of first movable part 4. First elastic support parts 52 and 54 can smoothly move, i.e., can be smoothly deformed along the vibration direction. In this manner, first elastic support parts 52 and 54 provide a larger amplitude and move in the buckling direction or the pull direction, thus increasing the vibration output. Note that in accordance with the desired vibration range of first movable part 4, first elastic support parts 52 and 54 may be designed to have opposite spiral directions.

Second Movable Part 6

Second movable part 6 is disposed on the outer periphery side of first movable part 4 in housing 2, and held in a movable manner in the vibration direction (the X direction) in the state of being suspended by second elastic support parts 72 and 74 joined at both end portions 6301 and 6302 in the vibration direction (the X direction), for example.

Figure 8:
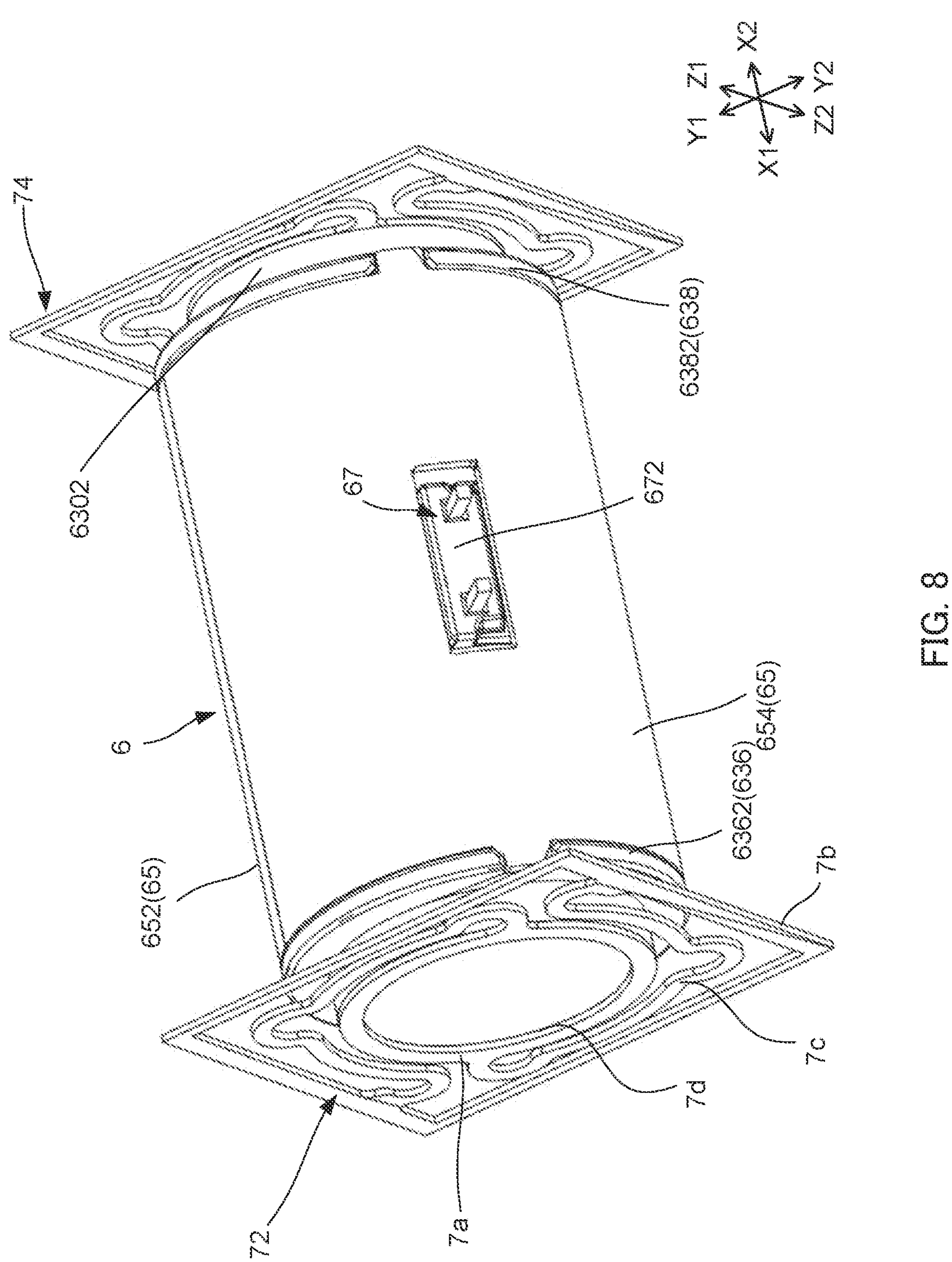
FIG. 8 is a perspective view illustrating a second movable part of the vibration actuator according to Embodiment 1 of the present invention.
Figure 9:
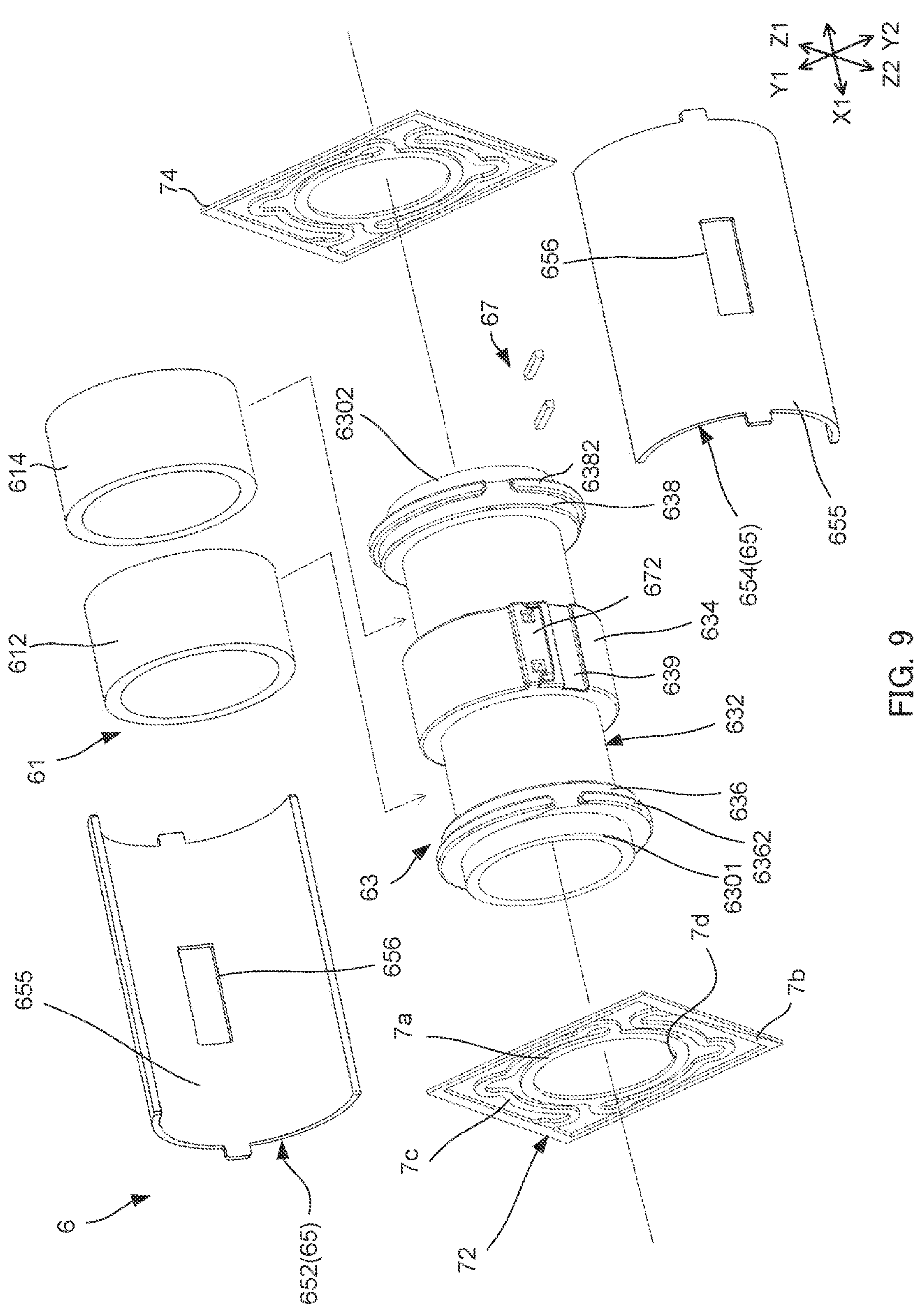
FIG. 9 is an exploded perspective view of the second movable part of the vibration actuator according to Embodiment 1 of the present invention.
Figure 10:
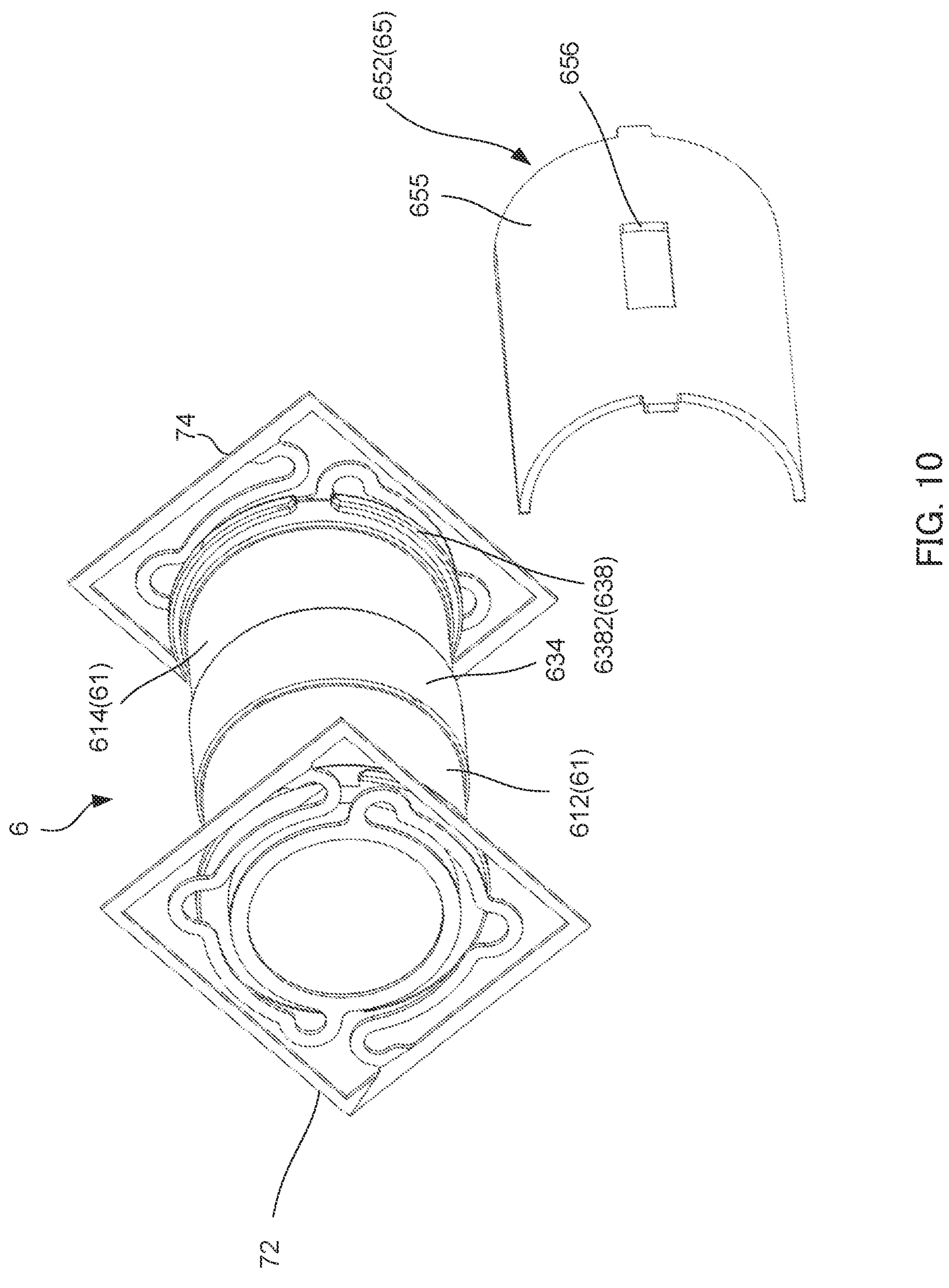
FIG. 10 is a back side perspective view of the second movable part of the vibration actuator according to Embodiment 1 of the present invention.

FIG. 8 is a perspective view illustrating second movable part 6 of the vibration actuator according to Embodiment 1 of the present invention, and FIG. 9 is an exploded perspective view of second movable part 6 of the vibration actuator according to Embodiment 1 of the present invention. In addition, FIG. 10 is a back side perspective view of second movable part 6 of the vibration actuator according to Embodiment 1 of the present invention.

Second movable part 6 includes coil part 61, coil holding part 63, and outer yoke 65.

Coil Part 61

Coil part 61 in vibration actuator 1 makes up the magnetic circuit used for generating the driving source together with magnet 41 with the axis direction of coil part 61 as the vibration direction.

Coil part 61 is disposed coaxially with magnet 41 to surround magnet 41. When energized, coil part 61 drives first movable part 4 and second movable part 6 to move them in the vibration direction and generate vibration. Coil part 61 makes up the voice coil motor together with magnet 41. Note that in the present embodiment, coil part 61 is the pair of coils 612 and 614, but one coil or three or more coils may be used as long as they form the magnetic circuit that drives in the same manner, while it is desirable to dispose the coil in a bilaterally symmetric manner in the vibration direction.

The pair of coils 612 and 614 is disposed at positions symmetric about magnet 41 in the vibration direction with respect to first movable part 4 including magnet 41, yokes 42 and 43 and the like. Preferably, the center position of the length of coils 612 and 614 in the vibration direction, i.e., the center position of the length between the left end of coil 612 and the right end of coil 614 is the same position (including substantially the same position) in the vibration direction as the center position of the length of magnet part 40 of first movable part 4 in the vibration direction.

In the present embodiment, the pair of coils 612 and 614 is composed of one coil winding wound in opposite directions, and when energized, current flows in the opposite directions through coils 612 and 614.

The end portions of the pair of coils 612 and 614, i.e., both end portions of the coil winding of making up the pair of coils 612 and 614 are tied and connected to the terminal tying part at the center of coil holding part 63.

Coil part 61 (the pair of coils 612 and 614) is connected to the power supply part through the terminal tying part. For example, the end portions of coil part 61 (the pair of coils 612 and 614) are connected to the alternating current supply part through the terminal tying part, and the alternating current power (AC voltage) is supplied from the alternating current supply part to coil part 61 (the pair of coils 612 and 614). In this manner, coil part 61 (the pair of coils 612 and 614) can generate a thrust for the movement in the contacting and separating directions in the mutual axis direction, between it and magnet 41.

Note that the coil winding connecting the pair of coils 612 and 614 is disposed in the groove of coil holding part 63. Note that in the present embodiment, coil part 61 (the pair of coils 612 and 614) is composed of a single winding, but this is not limitative, and coil part 61 (the pair of coils 612 and 614) may be composed of a pair of separate coils. In this configuration, in the case where the coils as separate members are composed of windings wound in the same direction, they supply respective currents in different directions when driven.

Note that preferably, the coil axis of the pair of coils 612 and 614 is coaxial with the axis of coil holding part 63 or the axis magnet 41.

In vibration actuator 1, the pair of coils 612 and 614 may be air-core coils, but it may be formed in a cylindrical form by winding a coil wire around coil holding part 63, for example. In this manner, coils 612 and 614 can be formed without using a self-welding wire, and thus cost reduction of the coil (the pair of coils 612 and 614) itself, and in turn cost reduction of the entire vibration actuator, are achieved.

Coil Holding Part 63

Coil holding part 63 is a cylindrical member that holds coil part 61 to surround magnet part 40, and is held in a movable manner in the vibration direction as second movable part 6 on the outer periphery side of first movable part 4 in housing 2. Coil holding part 63 may be referred to as coil bobbin, for example.

Preferably, coil holding part 63 is composed of a nonmagnetic substance, and is formed of resin such as phenol resin, and poly butylene terephthalate (polybutyleneterephtalate; PBT), for example. Preferably, coil holding part 63 is formed of a material containing a phenolic resin such as Bakelite, which is highly flame retardant.

With coil holding part 63 composed of a material containing phenol resin, a highly flame retardant structure can be achieved. In this manner, coil holding part 63 can improve the safety even when heat is generated together with the pair of coils 612 and 614 due to the Joule heat during the driving when current flows through the coil held (the pair of coils 612 and 614). In addition, the dimensional accuracy is increased, and the positional accuracy of the coil (the pair of coils 612 and 614) is increased, thus reducing variation in vibration characteristics.

As illustrated in FIG. 9, coil holding part 63 has a cylindrical shape, and includes cylindrical body part 632 making up a recess in the outer surface, where the coil is wound. Coil holding part 63 includes center flange part 634 at the center portion sandwiching cylindrical body part 632 in the vibration direction, and both end flange parts 636 and 638 at both end portions in the vibration direction.

Cylindrical body part 632 forms a recess that opens in the radial direction at the outer peripheral surface between center flange part 634 and both end flange parts 636 and 638. Center flange part 634 is provided with groove 639 extending in the vibration direction (the X direction) and connecting cylindrical body part 632.

In cylindrical body part 632, the pair of coils 612 and 614 is disposed at the outer peripheral surface. Cylindrical body part 632 is located between magnet part 40 and coil part 61 in the direction orthogonal to the vibration direction, i.e., the radial direction. The inner peripheral surface of cylindrical body part 632 can guide first movable part 4 in a movable manner back and forth along the inner peripheral surface. Cylindrical body part 632 serves as a protect wall that prevents collision between first movable part 4 and coil part 61 to prevent the contact between magnet part 40 and coil part 61 when first movable part 4 and second movable part 6 are driven.

The thickness of cylindrical body part 632 is a thickness that achieves a strength with which the pair of held coils 612 and 614 is not affected at all even when moving first movable part 4 makes contact with it. Terminal tying part 67 is provided to protrude radially outward at center flange part 634. Terminal tying part 67 is exposed to the outside from opening 656 of outer yoke 65, increasing the ease of the connection to the external apparatus.

Terminal tying part 67 is a conductive member, and includes a rod-shaped member for tying coil windings. Terminal tying part 67 is provided with the base end portion pressed into the outer periphery part of the center flange part of coil holding part 63. The end portion of the winding making up the coil is tied and reliably connected to terminal tying part 67 through solder or the like.

The diameter of portion 672 excluding terminal tying part 67 in center flange part 634, i.e., the diameter of the outer periphery part of the center flange part is smaller than the maximum diameter of the outer periphery part of other flange parts (end flange part) 636 and 638. In addition, at end flange parts 636 and 638, guides 6362 and 6382 protruding in the circumferential direction are formed.

Outer yoke 65 covering coils 612 and 614 are disposed between guides 6362 and 6382. Outer yoke 65 includes a claw that engages with the notch provided in each of guides 6362 and 6382. With the claws engaged with the notches of guides 6362 and 6382, outer yoke 65 is disposed at a center portion in the vibration direction as the desired position at the outer peripheral surface of coil holding part 63.

When attached to coil holding part 63, outer yoke 65 covers the cylindrical body where coils 612 and 614 are disposed in the state where the outer surface of outer yoke 65 and guides 6362 and 6382 of end flange parts 636 and 638 are set to flush with each other. Note that through the coil winding passed through groove 639 (see FIG. 9), the winding directions of the coil windings at the pair of coils 612 and 614 are set to opposite directions.

Outer Yoke 65

Outer yoke 65 is a cylindrical magnetic substance disposed to surround the outer peripheral surface of coil holding part 63 at a position covering the pair of coils from the outside in the radial direction. In the present embodiment, outer yoke 65 is formed in a cylindrical shape composed of a combination of divided members 652 and 654. With divided members 652 and 654, vibration actuator 1 is easy to assemble, thus improving the ease of assembly in comparison with a unitary configuration.

As described above, outer yoke 65 makes up the magnetic circuit of second movable part 6 together with coil part 61, and makes up the magnetic circuit of the vibration actuator together with the magnetic circuit of first movable part 4, i.e., magnet 41, and yokes 42 and 43. Outer yoke 65 prevents leakage flux to the outside of vibration actuator 1 in the magnetic circuit.

Outer yoke 65 can increase the thrust constant and increase the electromagnetic conversion efficiency in the magnetic circuit. Note that outer yoke 65 has a function of a magnetic spring utilizing the magnetic attractive force of magnet 41 together with magnet 41. Outer yoke 65 can reduce the stress in the case where first elastic support parts 52 and 54 and second elastic support parts 72 and 74 are machine springs, and can increase the durability of first elastic support parts 52 and 54 and second elastic support parts 72 and 74.

Outer yoke 65 includes divided member body 655, and opening 656 provided in the vibration direction and the circumferential direction in divided member body 655.

Divided member body 655 is formed in an arc shape, and formed of an SECC (electro-galvanized steel sheet) with excellent weldability and corrosion resistance, for example.

Divided member body 655 has flexibility. Each opening 656 is provided in the center portion in the vibration direction and the center portion in the circumferential direction in divided member body 655.

Opening 656 is formed at a position corresponding to the position of terminal tying part 67 on coil holding part 63 side. It is formed in a rectangular shape defined by parallel sides in the circumferential direction and symmetric upper and lower sides in the vibration direction in divided member body 655.

Terminal tying part 67 is inserted to opening 656. The opening is disposed at the same height such that the protruding part where the terminal tying part is provided in center flange part 634 disposed inside is internally fitted to it at the center of the length of outer yoke 65 in the vibration direction. With the shielding effect of outer yoke 65, the leakage magnetic flux to the outside of the vibration actuator can be reduced.

Divided members 652 and 654 making up outer yoke 65 have the same structure, and the opening is disposed also on the back side of coil holding part 63 in the state where outer yoke 65 is attached to coil holding part 63 as illustrated in FIG. 10. Since the same component can be used in this manner, production cost of the components can be reduced. In addition, outer yoke 65 surrounding second movable part 6 has a configuration provided with the openings located at the symmetric positions with respect to the axis extending in the vibration direction, and the structure for supplying the magnetic flux can be symmetric even as the magnetic circuit configuration.

Second Elastic Support Parts 72 and 74

As illustrated in FIGS. 8 to 10, second elastic support parts 72 and 74 support second movable part 6 in a movable manner back and forth in the vibration direction with respect to housing 2.

Second elastic support parts 72 and 74 are provided to sandwich second movable part 6 in the vibration direction (the X direction) of second movable part 6, and intersect the vibration direction over both second movable part 6 and the peripheral wall of housing 2.

In the present embodiment, second elastic support parts 72 and 74 are attached in parallel to each other over both end portions (both end portions of coil holding part 63 in the vibration direction) 6301 and 6302 of second movable part 6 and housing 2 (housing body 22) as illustrated in FIGS. 3, 4, and 9.

Second elastic support parts 72 and 74 are formed in a rectangular plate shape (for example, a square shape), in which annular inner periphery part **7*a* as the inner spring end portion and frame-shaped outer fixing part 7*b* as the outer spring end portion are joined by elastically deformable arm part 7*c*** with an arc plan shape.

Second elastic support parts 72 and 74 support second movable part 6 such that second movable part 6 is movable in the axis direction (the vibration direction, the X direction) without making contact with housing 2 and first movable part 4 regardless of whether first movable part 4 is moving.

Second elastic support parts 72 and 74 may be composed of two or more spring members (such as leaf springs) for second movable part 6. The plurality of leaf springs are attached along the direction orthogonal to the vibration direction.

In addition, second elastic support parts 72 and 74 may be composed of any materials as long as the material elastically supports second movable part 6 in a movable manner back and forth. In the present embodiment, second elastic support parts 72 and 74 are the same member with the same configuration.

Both end portions 6301 and 6302 of second movable part 6 are joined to inner periphery part **7*a*. Inner periphery part 7*a* may be fixed by bonding, or fitted from the outside, or, joined by caulking, to both end portions 6301 and 6302, for example. Inner periphery part 7*a* includes through hole 7*d* disposed at the center of second elastic support parts 72 and 74. First movable part 4 (more specifically, both end portions of first movable part 4) is inserted to through hole 7*d*** in a movable manner in the vibration direction.

On the other hand, outer periphery part **7*b* is fixed to the peripheral walls around the X direction axis as the vibration direction in housing 2 so as to be orthogonal to the vibration direction. Outer periphery part 7 is bonded to housing 2** with adhesive or the like, for example.

Arm part **7*c* is formed in a spiral form curved and extended along inner periphery part 7*a* between inner periphery part 7*a* and outer periphery part 7*b* so as to ensure the length for elastic deformation. In arm part 7*c*, inner periphery part 7*a* and outer periphery part 7*b*** are relatively displaced in the axis direction (the vibration direction, the X direction) through its deformation.

The spring member as second elastic support parts 72 and 74 may be formed of any material as long as the material is elastically deformable, and may be formed by processing a sheet metal by using a stainless-steel sheet, a phosphor bronze or the like. Second elastic support parts 72 and 74 may be composed of a thin, flat, rectangular leaf spring with an inner spiral part formed of a material with excellent corrosion resistance such as stainless-steel sheet and phosphor bronze. In addition, it may be composed of a nonmagnetic substance with high workability, tensile strength and wear resistance such as phosphor bronze. In this manner, the magnetic flux flow of the magnetic circuit is not disturbed at all. Second elastic support parts 72 and 74 may be formed of resin as long as second movable part 6 is supported such that second movable part 6 can be vibrated. In addition, since second elastic support parts 72 and 74 have a plate shape, improvement of the positional accuracy, i.e., improvement of the processing accuracy can be achieved in comparison with a cone-shaped spring.

In the present embodiment, second elastic support parts 72 and 74 are joined to second movable part 6 and housing 2 in the postures that set the same spiral direction. Thus, even when the movement amount of second movable part 6 increases and second movable part 6 moves in the translation direction (here, the direction on the plane perpendicular to the vibration direction) while rotating, albeit slightly, they can smoothly move, i.e., can be smoothly deformed along the vibration direction by rotating in the same direction as with first elastic support parts 52 and 54. In this manner, second elastic support parts 72 and 74 provide a larger amplitude and move in the buckling direction or the pull direction, thus increasing the vibration output. Note that in accordance with the desired vibration range of second movable part 6, second elastic support parts 72 and 74 may be designed to have opposite spiral directions.

Basic Operation of Vibration Actuator 1

With reference to FIG. 11, a basic operation of a configuration of the magnetic circuit of vibration actuator 1 is described below. FIG. 11 is a diagram schematically illustrating a magnetic circuit configuration of the same vibration actuator.

Regarding an operation of vibration actuator 1, the following describes a case where magnet 41 is magnetized such that front surface 4101 on one side of the magnetization direction (in the present embodiment, the left side in FIG. 11) is the N pole, and rear surface 4102 on the other side of the magnetization direction (in the present embodiment, the right side in FIG. 11) is the S pole.

In vibration actuator 1, first movable part 4 is considered to be the mass in a vibration model of a spring-mass system, and second movable part 6 also moves together with first movable part 4 when coils 612 and 614 are energized.

In vibration actuator 1, when first movable part 4 and second movable part 6 are both located at the amplitude zero position in the vibration direction, magnet 41 is disposed at a center portion of housing 2. In addition, the pair of coils 612 and 614 are disposed to surround yokes 42 and 43 on the outer periphery side of yokes 42 and 43 so as to receive the magnetic flux from yokes 42 and 43 sandwiching magnet 41 in first movable part 4.

In vibration actuator 1, flow is generated as flow mf of magnetic flux emitted from front surface 4101 side of magnet 41 and radiated from yoke 42 to coil 612 side through outer yoke 65, and from yoke 43 to magnet 41 through coil 614.

When energized as illustrated in FIG. 11, through the interaction of the magnetic field of magnet 41 and the current flowing through the coil (the pair of coils 612 and 614), the Lorentz force in the −f direction based on Fleming's left hand rule is generated at the pair of coils 612 and 614.

The Lorentz force in the −f direction is in the direction orthogonal to the direction of the current flowing through the coil (the pair of coils 612 and 614) and the direction of the magnetic field. The coil (the pair of coils 612 and 614) is movably provided as second movable part 6 with second elastic support parts 72 and 74, and thus a thrust of movement in the −f direction, i.e., the X2 direction is generated at second movable part 6. In addition, when the Lorentz force in the −f direction is generated at the coil (the pair of coils 612 and 614), a force opposite to the Lorentz force in the −f direction is generated based on the action-reaction law as a thrust in F direction for first movable part 4 including magnet 41, and as a result first movable part 4 including magnet 41 acts to move in the F direction, i.e., the X1 direction.

In addition, when the energization direction of the pair of coils 612 and 614 is switched to the opposite direction and the pair of coils 612 and 614 is energized, a Lorentz force in the f direction opposite to the −f direction is generated. When the Lorentz force in the f direction is generated, a thrust that acts to move in the f direction, i.e., the X1 direction is generated at second movable part 6, and a force opposite to the Lorentz force in the f direction based on the action-reaction law of the Lorentz force in the f direction is generated as a thrust in the −f direction at first movable part 4.

First movable part 4 and second movable part 6 move back and forth, i.e., vibrate, in the vibration direction in accordance with the generated respective thrusts, and thus generate the vibration of vibration actuator 1 itself. The movements (for example, amplitude and phase) of first movable part 4 and second movable part 6 during the vibration generated at each of first movable part 4 and second movable part 6 are set by the input frequency.

That is, the amplitude and phase of first movable part 4 and second movable part 6 are set by the input frequency, and various vibrations can be generated and expressed in vibration actuator 1 with the mutual movement (amplitude and phase) of first movable part 4 and second movable part 6 in the vibration direction.

Note that in vibration actuator 1 in the state of non-vibration with no energization, a magnetic attractive force acts between magnet 41 and outer yoke 65 to achieve a function of a magnetic spring. With the magnetic attractive force generated between magnet 41 and outer yoke 65 (652, 654), and the restoration force to the original shape of first elastic support parts 52 and 54 and second elastic support parts 72 and 74, first movable part 4 and second movable part 6 act to return to the original position. By repeating this, vibration is generated.

Vibration actuator 1 is driven with the alternating current wave input from the power supply part to coil part 61 (the pair of coils 612 and 614). Specifically, the energization direction of coil part 61 (the pair of coils 612 and 614) is periodically switched, and the thrust in the left-right direction of housing 2, i.e., the thrust in the F and f directions as the X1 direction and the thrust in the −F and −f directions as the X2 direction alternately act on first movable part 4 and second movable part 6. In this manner, first movable part 4 and second movable part 6 move and vibrate in the respective vibration directions as necessary in accordance with the energized power.

The equation of motion and the circuit equation of the driving principle of vibration actuator 1 are as follows. Vibration actuator 1 is driven based on the equation of motion represented by the following Equations (1) and (2) and the circuit equation represented by the following Equation (3).

[1]

$$m_1 \frac{d^2 x_1(t)}{dt^2} = K_f i(t) - K_1 x_1(t) - D_1 \frac{dx_1(t)}{dt} \quad \text{(Equation 1)}$$

$$m_2 \frac{d^2 x_2(t)}{dt^2} = -K_f i(t) - K_2 x_2(t) - D_2 \frac{dx_2(t)}{dt} \quad \text{(Equation 2)}$$

$m_1$: Mass of first movable part [kg]
$m_2$: Mass of second movable part [kg]
$x_1(t)$: Displacement of first movable part [m]
$x_2(t)$: Displacement of second movable part [m]
$K_f$: Thrust constant [N/A]
i(t): Current [A]
$K_1$: Spring constant of first elastic support part [N/m]
$K_2$: Spring constant of second elastic support part [N/m]
$D_1$: Attenuation coefficient of first vibration system [N/(m/s)]
$D_2$: Attenuation coefficient of second vibration system [N/(m/s)]

[2]

$$e(t) = Ri(t) + L\frac{di(t)}{dt} + K_e \frac{d\{x_1(t) - x_2(t)\}}{dt} \quad \text{(Equation 3)}$$

E(t): Voltage [V]
R: Resistance [Ω]
L: Inductance [H]
$K_e$: Counter electromotive force constant [V/(m/s)]

That is, in vibration actuator 1, mass m1 [kg] of the first movable part, mass m2 [kg] of the second movable part, displacement x1(t) [m] of the first movable part, displacement x2(t) [m] of the second movable part, thrust constant Kf [N/A], current i(t) [A], spring constant K1 [N/m] of the first elastic support part, spring constant K2 [N/m] of the second elastic support part, attenuation coefficient D1 [N/(m/s)] of the first vibration system, attenuation coefficient D2 [N/(m/s)] of the second vibration system and the like can be changed as necessary as long as Equations (1) and (2) are satisfied. In addition, voltage e(t) [V], resistance R [Ω], inductance L [H], and counter electromotive force constant Ke [V/(rad/s)] can be changed as necessary as long as Equation (3) is satisfied. Vibration actuator 1, satisfying Equation (1) to (3), is driven by the resonance phenomenon. Vibration is generated by energizing the coil with the alternating current wave corresponding to the resonance frequency set by the mass of the movable member and the spring constant of the elastic support part.

Vibration Characteristics of Vibration Actuator 1

Figure 12:
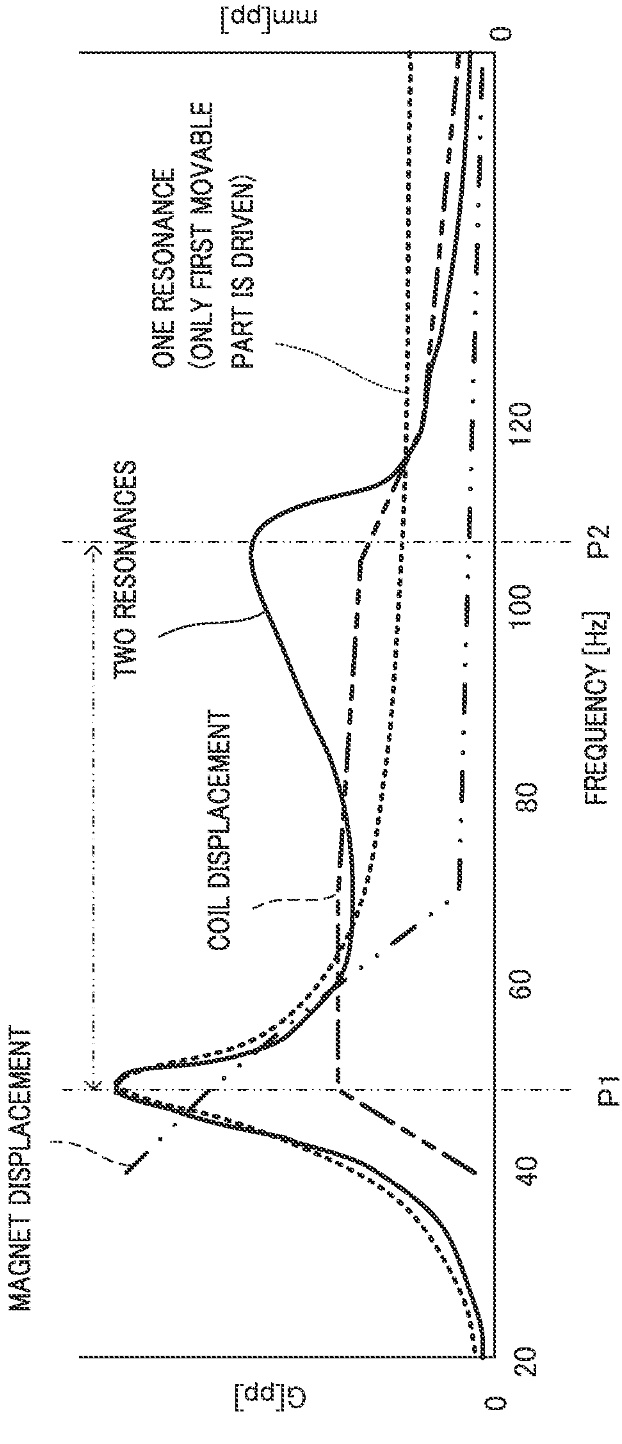
FIG. 12 is a diagram for describing vibrations generated by the vibration actuator according to Embodiment 1 of the present invention.

FIG. 12 is a diagram for describing vibrations generated by the vibration actuator according to Embodiment 1 of the present invention. FIG. 12 illustrates exemplary acceleration characteristics of a case where only first movable part 4 is vibrated (illustrated as "one resonance" in FIG. 12), and a case where first movable part 4 and second movable part 6 are vibrated (illustrates as "two resonances" in FIG. 12). The "two resonances" are the vibration characteristics of the vibration actuator according to Embodiment 1 of the present invention. The "one resonance" is the vibration characteristics of the vibration actuator according to a comparative example where the second movable part 6 is fixed so as not to vibrate while only first movable part 4 is vibrated. Note that FIG. 12 also illustrates displacements (i.e., maximum values (maximum amplitudes) of the displacement in the vibration) on the coil side (i.e., second movable part 6) and the magnet side (i.e., first movable part 4) in "two resonances".

As the curves representing the displacements show in FIG. 12, in vibration actuator 1, first movable part 4 (i.e., the first vibration system) supported by first elastic support parts 52 and 54 and second movable part 6 (i.e., the second vibration system) supported by second elastic support parts 72 and 74 have resonance points of different frequencies. First movable part 4 is configured to have a lower resonance frequency and move at a lower frequency than second movable part 6.

When coils 612 and 614 are energized, different vibrations are generated at first movable part 4 and second movable part 6, and the combined acceleration obtained from the accelerations of the vibrations is output to the outside from vibration actuator 1. In vibration actuator 1 with the two movable parts having different resonance frequencies, there are two peaks in the acceleration characteristics as the curve of "two resonances" represents in FIG. 12. More specifically, the two peaks are resonance point (first resonance frequency) P1 and resonance point (second resonance frequency) P2.

With an input frequency lower than resonance point P1, first movable part 4 is largely vibrated and displaced, while second movable part 6 is hardly vibrated or slightly vibrated and displaced.

At resonance point P1, the phase of first movable part 4 is changed from the state with the input frequency lower than resonance point P1, and first movable part 4 and second movable part 6 vibrate with the same phase.

In the frequency band between resonance point P1 and resonance point P2, first movable part 4 and second movable part 6 vibrate with the same phase. In this frequency band, the displacement of first movable part 4 decreases in comparison with the displacement at resonance point P1, but maintains a predetermined displacement or more, while the displacement of second movable part 6 is constant without being largely reduced in comparison with the displacement at resonance point P1.

In this manner, in vibration actuator 1, both first movable part 4 and second movable part 6 vibrate with the same phase between the vibration peaks (between P1 and P2), and maintain a predetermined displacement or more. In this manner, vibration actuator 1 can generate a larger vibration (i.e., a vibration with a higher G value represented by the left axis in FIG. 12) than the vibration actuator of the comparative example.

Vibration actuator 1 can generate vibration with the frequency in the period in which first movable part 4 and second movable part 6 are driven with the same phase, and can generate a predetermined strong vibration in comparison with the configuration (comparative example) in which there is one movable part in that frequency. In particular, in the present embodiment, deep tactile sensation can be expressed by applying strong vibration of a low frequency.

In addition, at resonance point P2, the phase of second movable part 6 is changed from the state with the input frequency lower than resonance point P2, and first movable part 4 and second movable part 6 vibrate in opposite phases. As such, the output acceleration (G value) is reduced than at resonance point P1, but a plurality of peaks that cannot be obtained in the comparative example can be obtained. Note that in the graph of the vibration characteristics illustrated in FIG. 12, the acceleration at resonance point P2 is smaller than at resonance point P1, but this is not limitative. The relationship of the resonance points P1 and P2 can be adjusted by the resonance frequency and the weights of the first movable part and the second movable part. For example, the acceleration can be larger than resonance point P1 in accordance with the value of the acceleration at resonance point P2.

When the input frequency exceeds resonance point P2, the displacement of second movable part 6 is reduced in vibration actuator 1. At this time, first movable part 4 and second movable part 6 vibrate in opposite phases as at resonance point P2. That is, as illustrated in FIG. 12, when the input frequency exceeds resonance point P2, second movable part 6 and first movable part 4 are displaced little in opposite phases, and the acceleration (G value) gradually decreases, and, as the frequency increases, the acceleration (G value) decreases in comparison with the comparative example.

In this manner, when the coil is energized at a frequency greater than resonance point P2, vibration actuator 1 generates vibration different from the vibration of the vibration actuator that is generated when first movable part 4 and second movable part 6 vibrate with the same phase, and thus can express different vibrations for the user and the like. With the different input frequencies, both the high acceleration and low acceleration can be output in comparison with the comparative example, and thus distinctness can be provided in the vibration strength.

Modification 1

Figure 13:
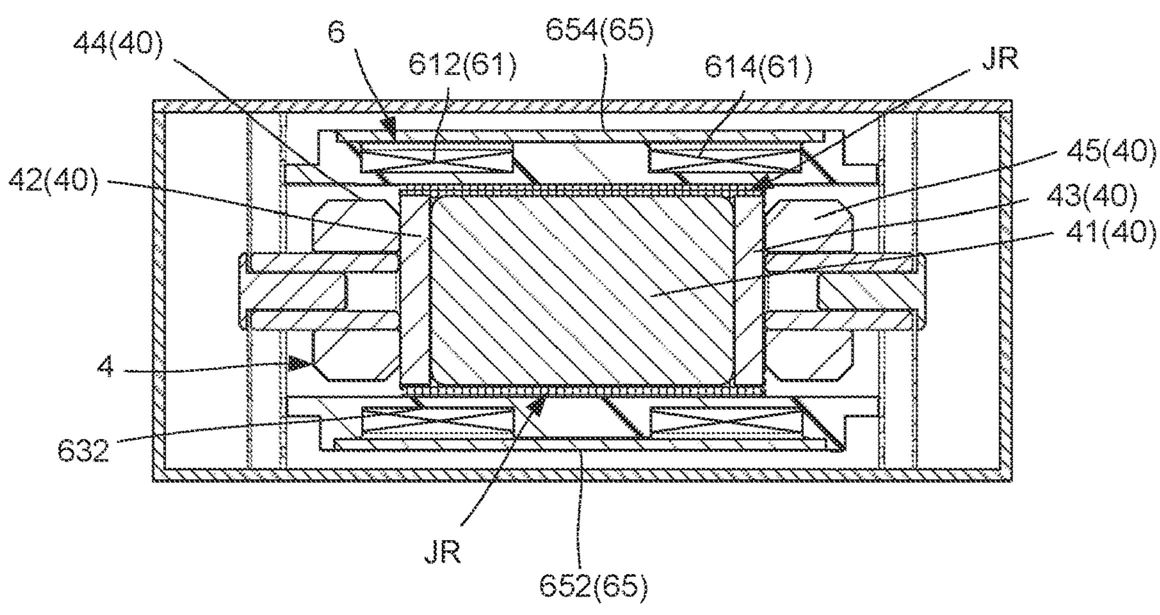
FIG. 13 is a diagram illustrating modification 1 of the vibration actuator according to Embodiment 1 of the present invention.
Figure 14:
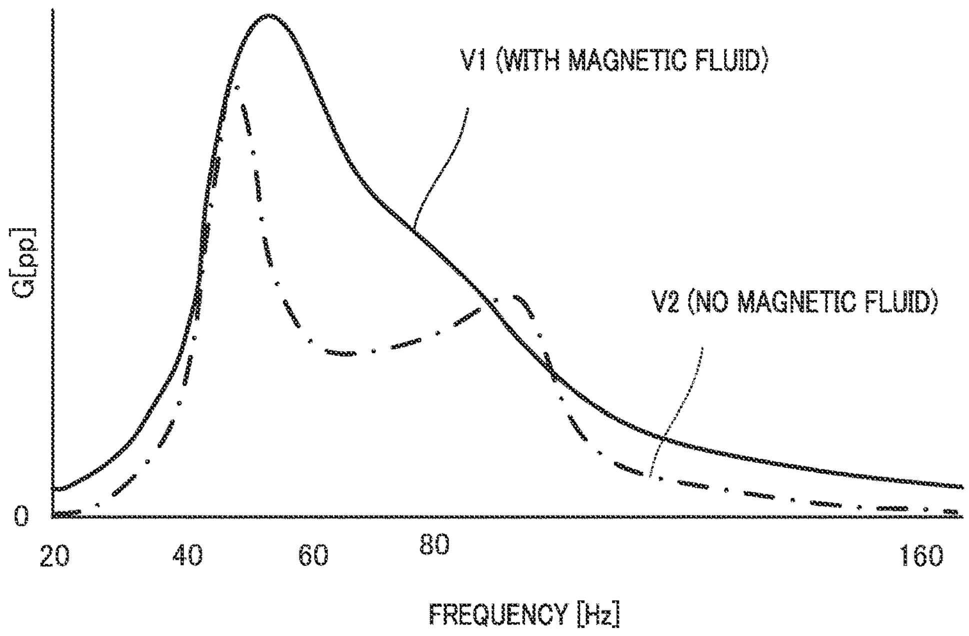
FIG. 14 is a diagram illustrating vibration characteristics of modification 1 of the vibration actuator according to Embodiment 1 of the present invention.

FIG. 13 is a longitudinal sectional view illustrating a configuration of a main part of a modification of vibration actuator 1. FIG. 14 is a diagram illustrating vibration characteristics of vibration actuator 10 of modification 1 illustrated in FIG. 13, and illustrates characteristics with magnetic fluid and characteristics with no magnetic fluid in vibration actuator 1. Note that the characteristics with magnetic fluid input higher voltage (for example, 2.4 times) than the characteristics with no magnetic fluid.

For example, vibration actuator 10 of the modification illustrated in FIG. 13 has a configuration in which magnetic fluid JR is interposed between first movable part 4 and the second movable part, i.e., inside second movable part 6 in vibration actuator 1.

Magnetic fluid JR is injected between magnet part 40 and coil part 61, i.e., between the inner peripheral surface of second movable part 6 and first movable part 4, and thus held with its magnetism between first movable part 4 and the second movable part.

In vibration actuator 10, which includes magnetic fluid JR between first movable part 4 and second movable part 6, first movable part 4 and second movable part 6 less move in the vibration direction, and the amplitude of first movable part 4 and second movable part 6 are attenuated.

In this manner, the peak of the amplitude during the resonance of first movable part 4 and second movable part 6 is attenuated, and the peak of the acceleration G value during the resonance is suppressed, and thus, the entire vibration characteristics, i.e., the entire acceleration during the vibration is reduced. Waveform V2 illustrated in FIG. 13 represents vibration characteristics before the reduction. In addition, when the peak of the acceleration G value is suppressed, the other acceleration relatively increases. Vibration actuator 1 that generates various vibrations can be achieved by inputting a high voltage so as to obtain the same peak as the peak of the acceleration represented by waveform V1, and by energizing the coil with the wide frequency band with smooth acceleration between peaks as represented by waveform V2.

Embodiment 2

Figure 15:
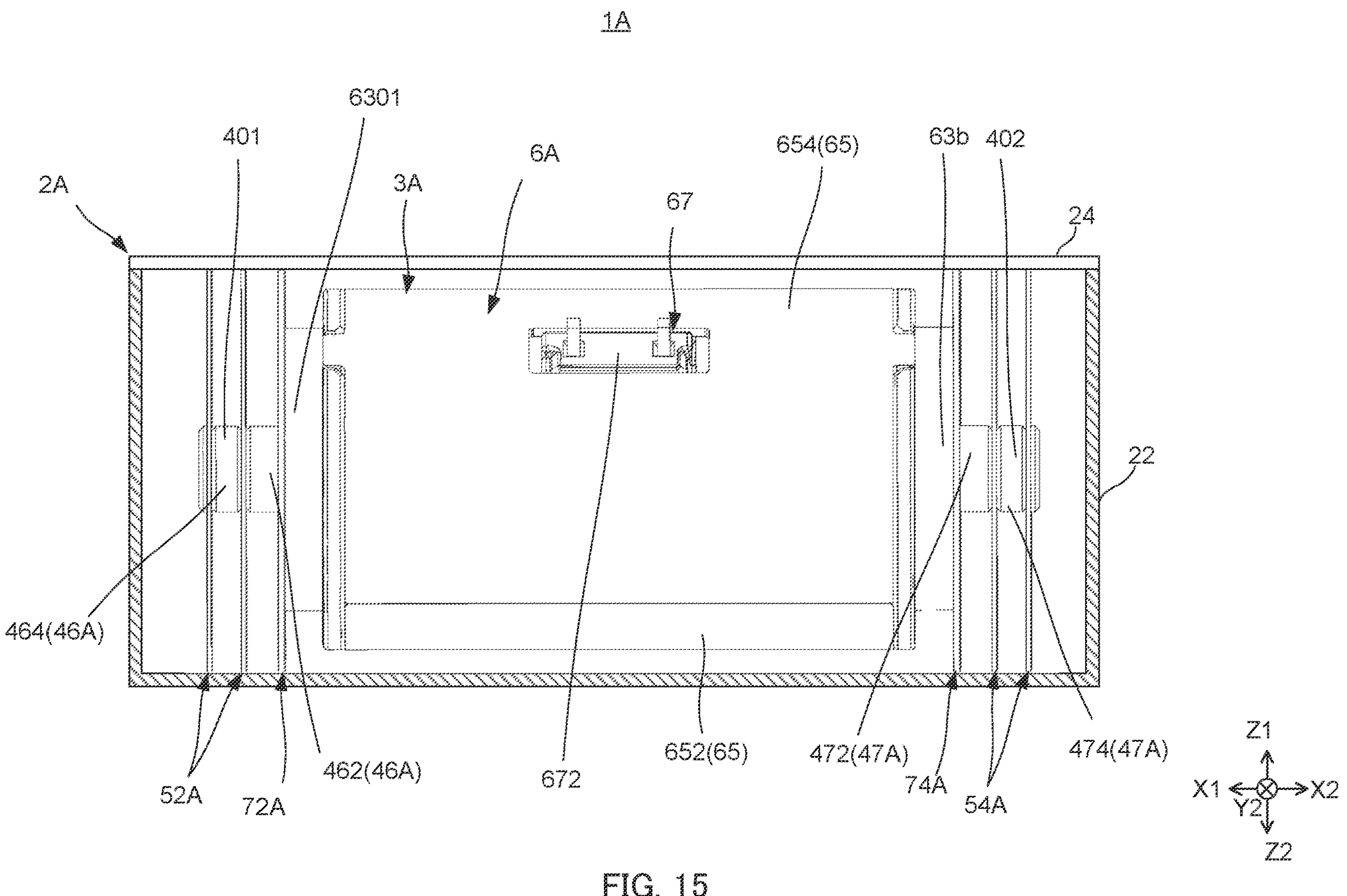
FIG. 15 is a front view illustrating a configuration of a main part of a vibration actuator according to Embodiment 2 of the present invention.
Figure 16:
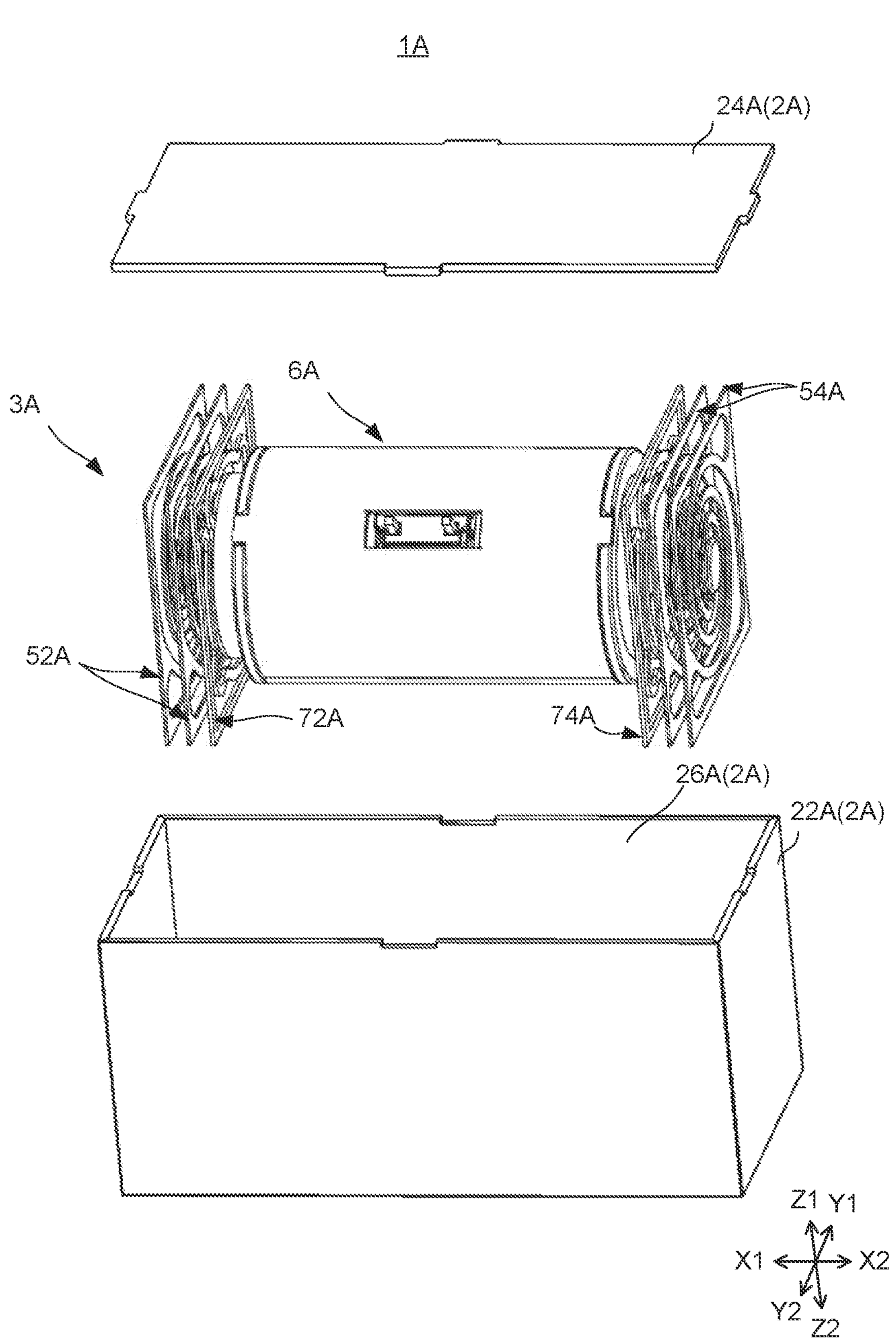
FIG. 16 is an exploded perspective view illustrating a configuration of a main part of the vibration actuator according to Embodiment 2 of the present invention.
Figure 17:
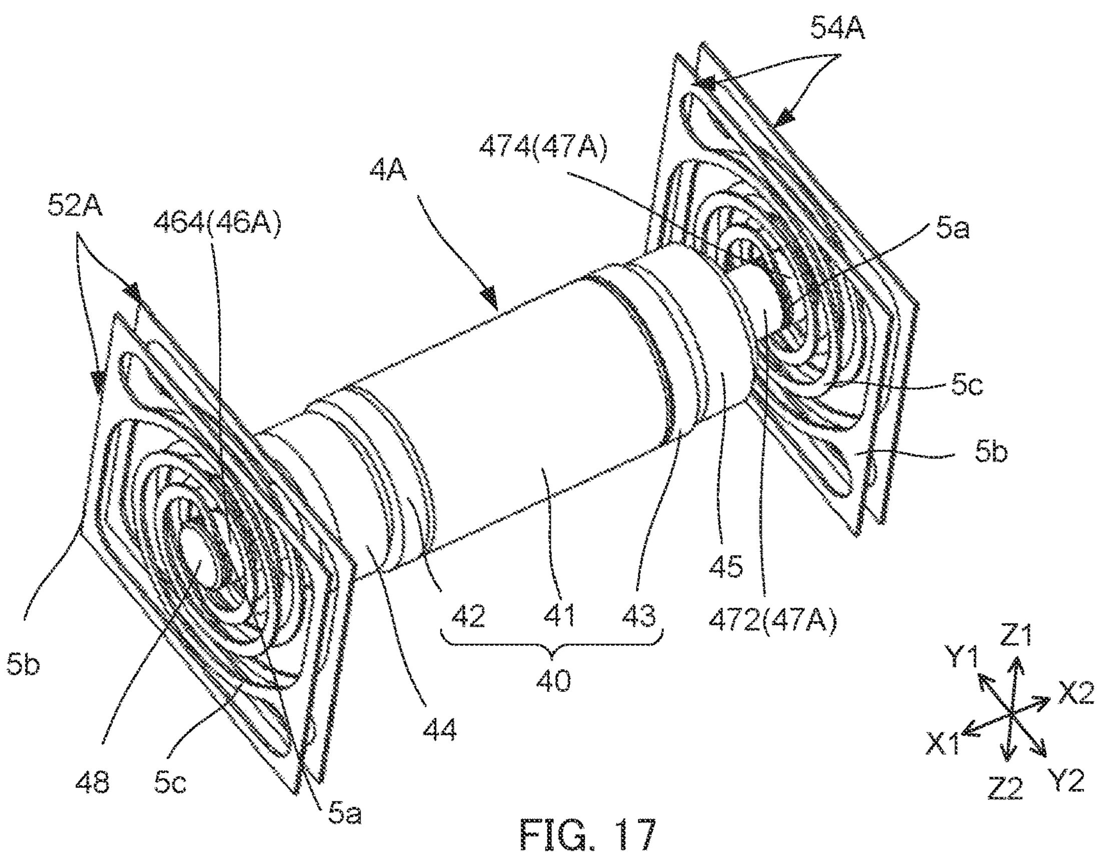
FIG. 17 is a perspective view illustrating a first movable part of the vibration actuator according to Embodiment 2 of the present invention.
Figure 18:
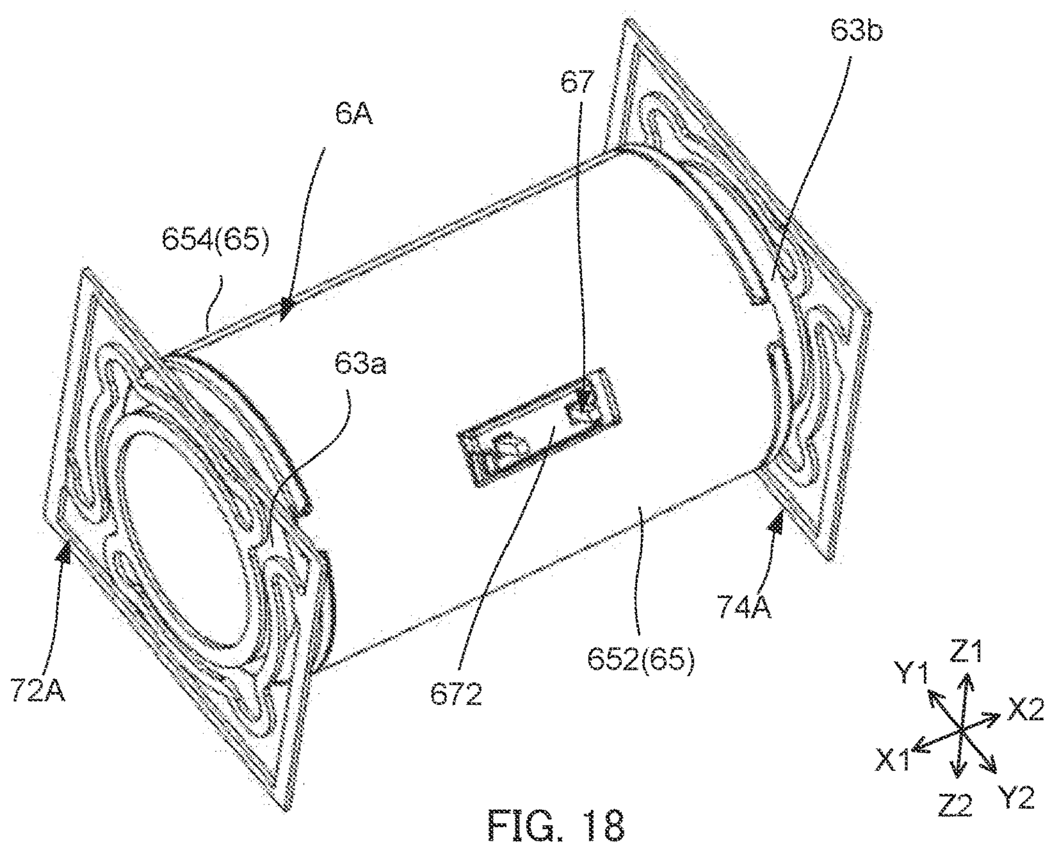
FIG. 18 is a perspective view illustrating a second movable part of the vibration actuator according to Embodiment 2 of the present invention.
Figure 19:
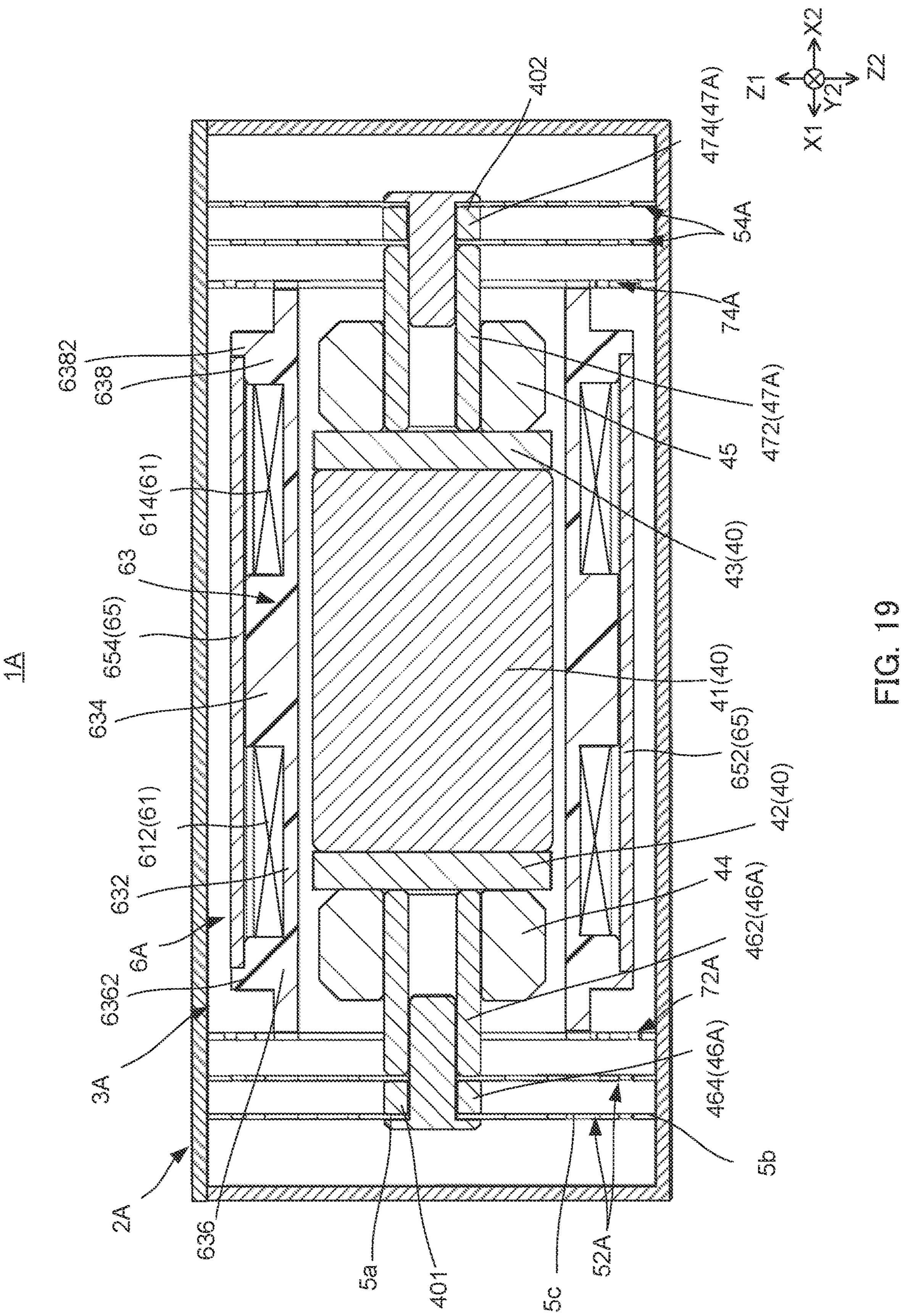
FIG. 19 is a longitudinal sectional view illustrating a configuration of a main part of the vibration actuator illustrated in FIG. 15.

FIG. 15 is a front view illustrating a configuration of a main part of a vibration actuator according to Embodiment 2 of the present invention, and FIG. 16 is an exploded perspective view illustrating a configuration of a main part of the vibration actuator according to Embodiment 2 of the present invention. In addition, FIG. 17 is a perspective view illustrating a first movable part of the vibration actuator according to Embodiment 2 of the present invention. FIG. 18 is a perspective view illustrating a second movable part of the vibration actuator according to Embodiment 2 of the present invention. FIG. 19 is a longitudinal sectional view illustrating a configuration of a main part of the vibration actuator illustrated in FIG. 15.

Vibration actuator 1A of Embodiment 2 is different from vibration actuator 1 only in the number of first elastic support parts 52A and 54A that support first movable part 4A, and other configurations are the same those of vibration actuator 1. Therefore, only configurations different from those of vibration actuator 1 are described below, and the same configurations are denoted with the same reference numerals and description thereof is omitted. Configurations having substantially the same functions are denoted with A for description.

As illustrated in FIGS. 15 and 16, vibration actuator 1A is a vibrating member including housing 2A with a cuboid shape and driving unit 3A housed in housing 2A. Driving unit 3A is different from driving unit 3 in that a plurality of (in the present embodiment, two) first elastic support parts for supporting first movable part 4A is provided on one side.

Housing 2A houses vibration unit 3A, and includes box-shaped housing body 22A opening at opening 26A and plate part 24A for closing opening 26A, and, has a function similar to that of housing 2. Note that housing 2A is formed in a cuboid shape so as to be easily mounted to the electric equipment at the outer flat surface, but this is not limitative, and, it may be formed in a columnar shape or a prismatic shape.

In vibration actuator 1A, when first movable part 4A and second movable part 6A of the driving unit are driven, vibration actuator 1A itself functions as a vibrating member.

Vibration unit 3A includes first movable part 4A including magnet part 40, first elastic support parts 52A and 54A, second movable part 6A including coil part 61 disposed at the outer periphery of magnet part 40, and second elastic support parts 72A and 74A.

In driving unit 3A, first movable part 4A and second movable part 6A are supported by first elastic support parts 52A and 54A and second elastic support parts 72A and 74A in a movable manner in the vibration direction, i.e., the X (X1 and X2) direction in housing 2A.

Note that since second movable part 6A has the same configuration as that of second movable part 6, its components are denoted with the same reference symbols and the description thereof is omitted. First movable part 4A is described below.

Driving unit 3A generates vibration by driving first movable part 4A and second movable part 6A through cooperation of energized coil part 61 (the pair of coils 612 and 614) and magnet part 40 (magnet 41, yokes 42 and 43).

First movable part 4A is held in a movable manner in the vibration direction (the X direction) in the state of being suspended through first elastic support parts 52A and 54A on both sides in the X direction in housing 2A, for example.

As illustrated in FIG. 17, in comparison with first movable part 4, first movable part 4A is supported in a movable manner in the vibration direction with a plurality of first elastic support parts 52A and 54A at both end portions in the vibration direction.

First movable part 4A includes magnet part 40, weight parts 44 and 45, sleeves 462 and 472 and auxiliary sleeves 464 and 474 as spring stopper parts 46A and 47A, and spring fixing parts 48 and 49.

Specifically, first movable part 4A is different from first movable part 4 in that it includes spring stopper parts 46A and 47A instead of sleeves 46 and 47. Note that magnet part 40, weight parts 44 and 45, and spring fixing parts 48 and 49 are the same as those of Embodiment 1, and therefore the description thereof is omitted.

Spring stopper parts 46A and 47A connect first movable part 4A, i.e., magnet part 40 and weight parts 44 and 45 to a plurality of leaf springs such as first elastic support parts 52A and 54A on both sides in the vibration direction (X1 and X2 directions). Through these leaf springs, first movable part 4A is supported at housing 2A in a movable manner in the vibration direction.

Sleeves 462 and 472 are provided at both end portions in the vibration direction, i.e., both sides of magnet part 40 in the vibration direction in first movable part 4A, and make up both end portions of first movable part 4A together with auxiliary sleeves 464 and 474.

Sleeves 462 and 472 have a cylindrical shape (which may be a rod shape such as a columnar shape) disposed along the central axis of first movable part 4A.

One end portions of sleeves 462 and 472 are inserted to weight parts 44 and 45, respectively, and disposed to protrude from the center portion of the surface of yokes 42 and 43. Sleeves 462 and 472 are fixed on one end portion sides to weight parts 44 and 45, respectively. Further, sleeves 46 and 47 may be fixed to yokes 42 and 43.

Sleeves 462 and 472 are fixed to the first elastic support parts 52A and 54A, respectively, at the other end portion, i.e., the end portion on the side away from magnet part 40 of first movable part 4A in the vibration direction. Sleeves 462 and 472 are joined to the first elastic support parts 52A and 54A through spring fixing parts 48 and 49 such as rivets, for example.

Auxiliary sleeves 464 and 474 are continuously disposed at sleeves 462 and 472 through the first elastic support parts 52A and 54A, respectively.

Auxiliary sleeves 464 and 474 function as spacers for separating first elastic support parts 52A and 54A joined at both end portions of first movable part 4A in the vibration direction. With auxiliary sleeves 464 and 474, the plurality of first elastic support parts 52A and 54A are separated from each other, and thus the elastic deformation regions of the plurality of first elastic support parts 52A and 54A can be ensured as necessary. By adjusting the number of the plurality of first elastic support parts 52A and 54A in this manner, the movement state, i.e., vibration, of first movable part 4A in the vibration direction can be changed as necessary.

Auxiliary sleeves 464 and 474 are joined to the second first elastic support parts 52A and 54A. Auxiliary sleeves 464 and 474 are alternately disposed together with sleeves 462 and 472 and first elastic support parts 52A and 54A, and they are joined to each other and fixed as one unit by fitting spring fixing parts 48 and 49 to them from both sides in the vibration direction.

Note that in vibration actuator 1A, spring stopper parts 46A and 47A are disposed to protrude outward from second elastic support parts 72A and 74A in the vibration direction. The protruded portion is provided such that first elastic support parts 52A and 54A are located at positions separated from second elastic support parts 72A and 74A in the vibration direction, i.e., positions where they do not overlap each other.

Note that sleeves 462 and 472 and auxiliary sleeves 464 and 474 may be connected to yokes 42 and 43, weight parts 44 and 45 and spring fixing parts 48 and 49 as necessary. They may be connected by bonding with heat curable adhesive such as epoxy resin or anaerobic adhesive, or by bonding alone, or, by a combination of welding, bonding and caulking, for example.

In addition, sleeves 462 and 472 are in contact with yokes 42 and 43 at one end portions, but sleeves 462 and 472 may not be in contact with yokes 42 and 43 at one end portions. Further, in the case where sleeves 462 and 472 have a function of weights with weights or the like provided in sleeves 462 and 472, the vibration output of vibration actuator 1A can be adjusted by adjusting the mass together with weight parts 44 and 45.

Further, sleeves 462 and 472, auxiliary sleeves 464 and 474 and first elastic support parts 52A and 54A are fixed by using rivets as spring fixing parts 48 and 49, but they may be fixed by using adhesive.

Sleeves 462 and 472 are joined to the inner periphery part of first elastic support parts 52A and 54A such that first movable part 4A is movable back and forth in the vibration direction with respect to the outer periphery part of first elastic support parts 52A and 54A through the deformation of first elastic support parts 52A and 54A. Note that sleeves 46 and 47 are formed of a copper sintered material together with auxiliary sleeves 464 and 474, for example.

In addition, sleeves 462 and 472 are disposed at positions outside the magnetic circuit including magnet part 40 in first movable part 4A, coil part 61, and outer yoke 65. In this manner, in particular, the installation space of coil part 61 is not limited, i.e., the distance between the magnetic circuit (magnet part 40) of the movable member and coil part 61 is not increased, and thus, the electromagnetic conversion efficiency is not reduced. Thus, the weight of first movable part 4A can be favorably increased, and the high vibration output can be achieved.

As illustrated in FIGS. 15 to 17, first elastic support parts 52A and 54A support first movable part 4A in a movable manner back and forth in the vibration direction with respect to housing 2A.

The plurality of first elastic support parts 52A and 54A are provided to sandwich first movable part 4A in the vibration direction of first movable part 4A, and intersect the vibration direction over both first movable part 4A and the peripheral wall housing 2A.

First elastic support parts 52A and 54A may have the same configuration as first elastic support parts 52 and 54 only with a difference from first elastic support parts 52 and 54 in the number of first elastic support parts 52A and 54A joined on one side in the vibration direction of first movable part 4A.

The plurality of first elastic support parts 52A and 54A are attached in parallel to each other over both end portions of first movable part 4A and the inner peripheral surface disposed around the axis in housing 2A facing both end portions.

The plurality of first elastic support parts 52A and 54A support respective both end portions of first movable part 4A at a plurality of positions in the axis direction.

The plurality of first elastic support parts 52A and 54A can distribute the supporting load of first movable part 4A to the plurality of first elastic support parts 52A and 54A at both end portions of first movable part 4A.

In the vibration system composed of the first elastic support part together with first movable part 4A, first movable part 4A is configured to drive at a lower frequency than second movable part 6A of the vibration system composed of the second elastic support part together with second movable part 6A.

To support first movable part 4A that vibrates at a low frequency with a large amplitude, it is supported with a corresponding soft elastic support part (with a small spring constant) that is easily deformed even with a small load, and it is highly possible that first movable part 4A is supported in a tilted state.

In vibration actuator 1A, the plurality of first elastic support parts 52A and 54A are provided at both end portions of first movable part 4A. In this manner, soft elastic support parts (springs) are applied for the plurality of first elastic support parts 52A and 54A to support first movable part 4A with a large amplitude at a plurality of positions. In this manner, in the state where the axis of first movable part 4A in the vibration direction is not shifted, i.e., the state where first movable part 4A is not easily tilted, first movable part 4A can be supported in a movable manner in the vibration direction.

First elastic support parts 52A and 54A are leaf springs with the same configuration as that of first elastic support parts 52 and 54. In the present embodiment, first elastic support parts 52A and 54A are the same member with the same configuration.

Each of first elastic support parts 52A and 54A is formed in a rectangular plate shape (for example, a square shape), and has a shape in which annular inner periphery part 5*a* as the inner spring end portion and frame-shaped outer periphery part 5*b* as the outer spring end portion are joined by elastically deformable deformation arm 5*c* with an arc-shape in plan view.

Deformation arm 5*c* is formed in a spiral shape so as to connect inner periphery part 5*a* and outer periphery part 5*b*, and ensure the length for elastic deformation. When deformation arm 5*c* is deformed, inner periphery part 5*a* and outer periphery part 5*b* are relatively displaced in the axis direction.

First elastic support parts 52A and 54A support first movable part 4A in a movable manner in the axis direction (the vibration direction) without making contact with housing 2A and second movable part 6A.

Note that regarding first elastic support parts 52A and 54A, the plurality of first elastic support parts 52A and 54A may be disposed side by side in parallel to each other at both end portions of first movable part 4A in an orientation with which the connection positions of deformation arm 5*c* and outer periphery part 5*b* do not overlap each other. For example, in the plurality of first elastic support part 52A, the connection position of first deformation arm 5*c* and outer periphery part 5*b* is set to connect in the Y1 and Y2 directions, and the connection position of second deformation arm 5*c* and outer periphery part 5*b* is set to connect in the Z1 and Z2 directions. That is, they are disposed such that the spiral directions are different from each other.

More specifically, two deformation arms 5*c* are arranged in each of first elastic support parts 52A and 54A, thus making up a two-part spring, for example. Note that first elastic support parts 52 and 54 and other first elastic support parts 52B, 52C, 52E, 52F, 54B, 54C, 54E and 54F described later may be formed in the same manner as first elastic support parts 52A and 54A. First elastic support parts 52A and 54A may be disposed on both sides of first movable part 4A with deformation arms 5*c* orientated by 90 degrees in a complementary positional relationship so as to support first movable part 4A from four sides through deformation arm 5*c*.

In this manner, first movable part 4A is equally supported in its whole circumference by first elastic support parts 52A and 54A in a movable manner with respect to housing 2A surrounding first movable part 4A, and thus can favorably move back and forth in the vibration direction without being tilted even when driven at a low frequency with a large amplitude.

Note that with first elastic support parts 52A and 54A, first movable part 4A does not make contact with the pair of coils 612 and 614 by making contact with the inner peripheral surface of cylindrical body part 632 (see FIG. 19) even when first movable part 4A is being driven or an external impact is received. Thus, coils 612 and 614 are not damaged.

Inner periphery part 5*a* is disposed in the direction orthogonal to the protruding direction of sleeves 462 and 472. Inner periphery part 5*a* includes connection hole 5*d* disposed at a center of first elastic support parts 52A and 54A, and spring fixing parts 48 and 49 are axially inserted to connection hole 5*d*.

In this manner, for example, inner periphery part 5*a* of each of the plurality of first elastic support parts 52A on one side of first movable part 4A is connected to and sandwiched by the end portion of sleeve 462, auxiliary sleeves 464 and 474 and the heads of spring fixing parts 48 and 49. Thus, the plurality of first elastic support parts 52A is firmly fixed to first movable part 4A.

On the other hand, outer periphery part 5*b* is fixed so as to be orthogonal to the vibration direction at the peripheral wall around the X direction as the vibration direction in housing 2A. Outer periphery part 5*b* is bonded to housing 2A by adhesive or the like, for example.

As with first elastic support parts 52 and 54, the leaf springs as first elastic support parts 52A and 54A may be formed of any material as described above as long as the material is elastically deformable.

Vibration actuator 1A having the above-mentioned configuration can achieve the same operations and effects as those of vibration actuator 1.

In the case where first movable part 4A is vibrated at a low frequency, it can be stably held by increasing the support locations by using the plurality of soft and elastically deformable first elastic support parts 52A and 54A even when first movable part 4A is configured to move with maximum displacement in the vibration direction.

In addition, vibration actuator 1A can achieve the same operations and effects as those of vibration actuator 1 more stably and correctly than vibration actuator 1.

Note that in the above-described embodiments, each component may be appropriately changed by the number of magnets in magnet part 40, the number of coils in coil part 61, the positions of the coils and magnets, the configurations and number of first elastic support parts 52, 52A, 54 and 54A and the like. Some examples are described below as modifications 2 to 6. Note that the basic configurations of modifications 2 to 6 are the same as to those of Embodiments 1 and 2, and therefore the operations and effects of the same functions are provided.

When vibration actuators 1 and 1A generate vibration, the amplitude decreases as the frequency increases, and thus first movable parts 4 and 4A can be supported in a movable manner back and forth with a small number of, e.g., one, first elastic support part. In vibration actuator 1A, first movable part 4A is supported by two first elastic support parts 52A and two first elastic support parts 54A at both end portions, and thus can be favorably supported even with vibration at a low frequency, so as to express the vibration.

Modification 2

Figure 20:
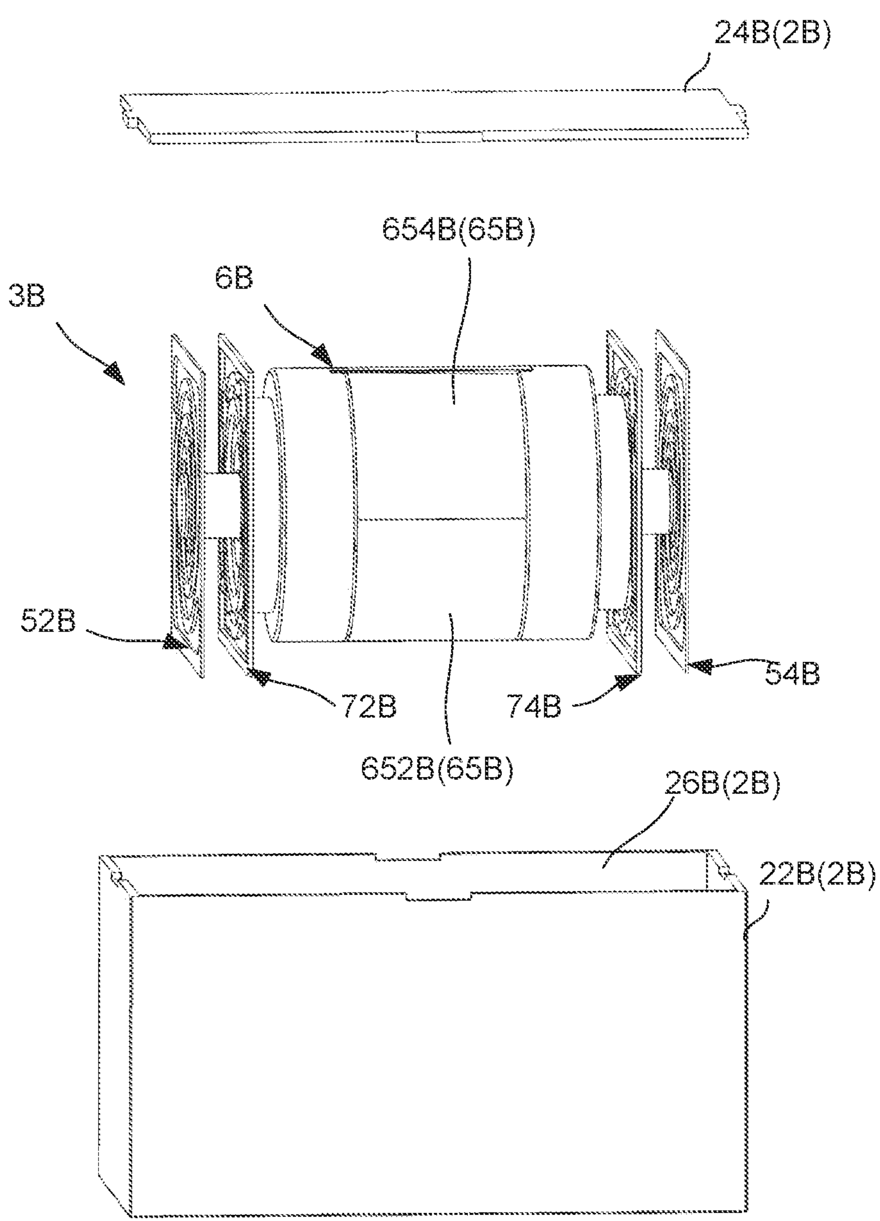
FIG. 20 is an exploded perspective view illustrating modification 2 of the vibration actuator according to the embodiment of the present invention.
Figure 21:
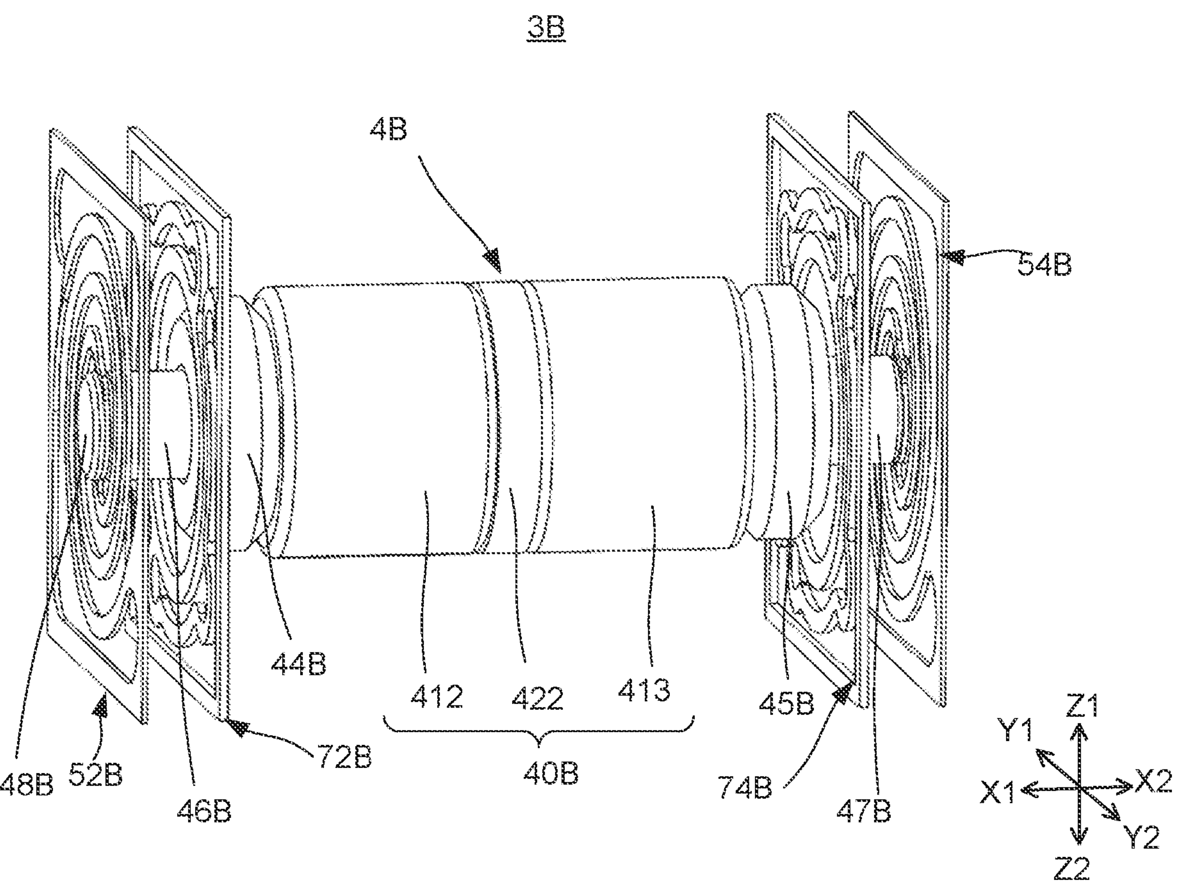
FIG. 21 is a perspective view of a first movable part of modification 2 of the vibration actuator.

FIG. 20 is an exploded perspective view illustrating a vibration actuator of modification 2 of the embodiment of the present invention, and FIG. 21 is a perspective view of a first movable part of modification 2 of the vibration actuator. In addition, FIG. 22 is a longitudinal sectional view illustrating a configuration of a main part of modification 2 of the vibration actuator according to the embodiment of the present invention.

Vibration actuator 1B of modification 2 is different from vibration actuator 1 in shapes of magnet part 40B and coil part 61B, while other components have similar functions, although they may differ in shape. Therefore, only configurations different from those of vibration actuator 1 are described below, and the same configurations are denoted with the same reference numerals and description thereof is omitted. Configurations having substantially the same functions are denoted with B for description.

Vibration actuator 1B is a vibrating member including housing 2B with a cuboid shape, and driving unit 3B housed in housing 2B. Driving unit 3B is different from driving unit 3 in the number of magnets of first movable part 4B, and the number of coils of second movable part 6B.

Figure 22:
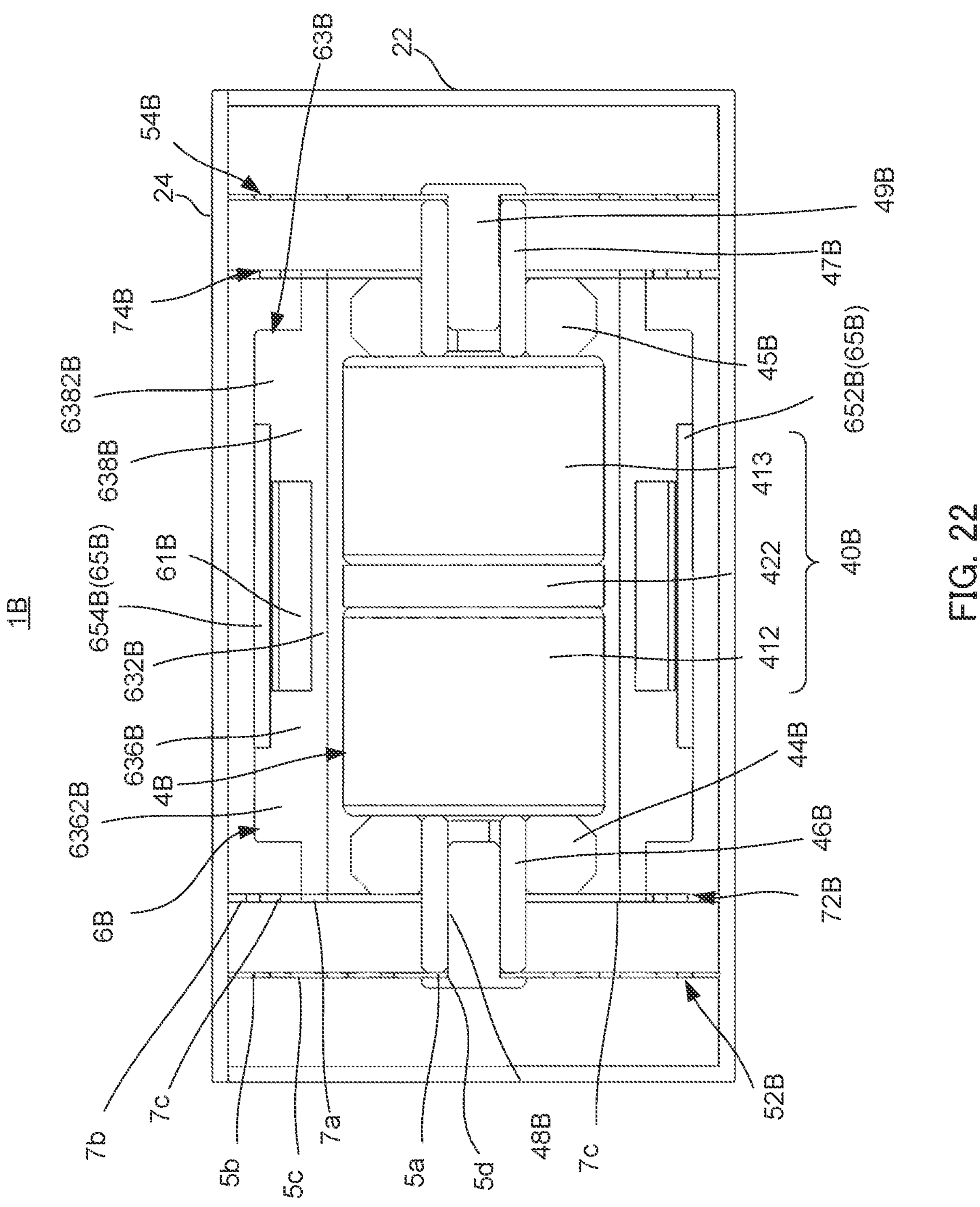
FIG. 22 is a diagram illustrating a configuration of a main part of modification 2 of the vibration actuator according to the embodiment of the present invention.

As illustrated in FIGS. 20 to 22, vibration unit 3B includes first movable part 4B including magnet part 40B, first elastic support parts 52B and 54B, second movable part 6B including coil part 61B, and second elastic support parts 72B and 74B.

First elastic support parts 52B and 54B support first movable part 4B in a movable manner back and forth at both end portions in the vibration direction (the X direction). Second elastic support parts 72B and 74B support second movable part 6B disposed at the outer periphery of magnet part 40B in a movable manner back and forth at both end portions in the vibration direction (the X direction) on the outer periphery side of magnet part 40B. Driving unit 3B generates vibration by driving first movable part 4B and second movable part 6B through cooperation of energized coil part 61B and magnet part 40B.

First movable part 4B includes magnet part 40B, weight parts 44B and 45B, spring stopper parts 46B and 47B, and spring fixing parts 48B and 49B. In addition, second movable part 6B includes coil part 61B, coil holding part 63B, and outer yoke 65B including divided members 652B and 654B.

In magnet part 40B in first movable part 4B, two magnets 412 and 413 are disposed with the same poles facing each other in the vibration direction and integrally formed with yoke 422 interposed therebetween in both directions. On the other hand, coil part 61B of second movable part 6B is composed of one coil disposed to surround the periphery of yoke 422.

In second movable part 6B, at the outer surface of coil holding part 63B that holds coil part 61B, outer yoke 65B surrounding the periphery of coil part 61B is disposed between guides 6362B and 6382B of end flange parts 636B and 638B. Outer yoke 65B is composed of divided members 652B and 654B. In this manner, a magnetic circuit that efficiency uses the magnetic force is achieved, and the size reduction can be achieved.

Modification 3

Figure 23:
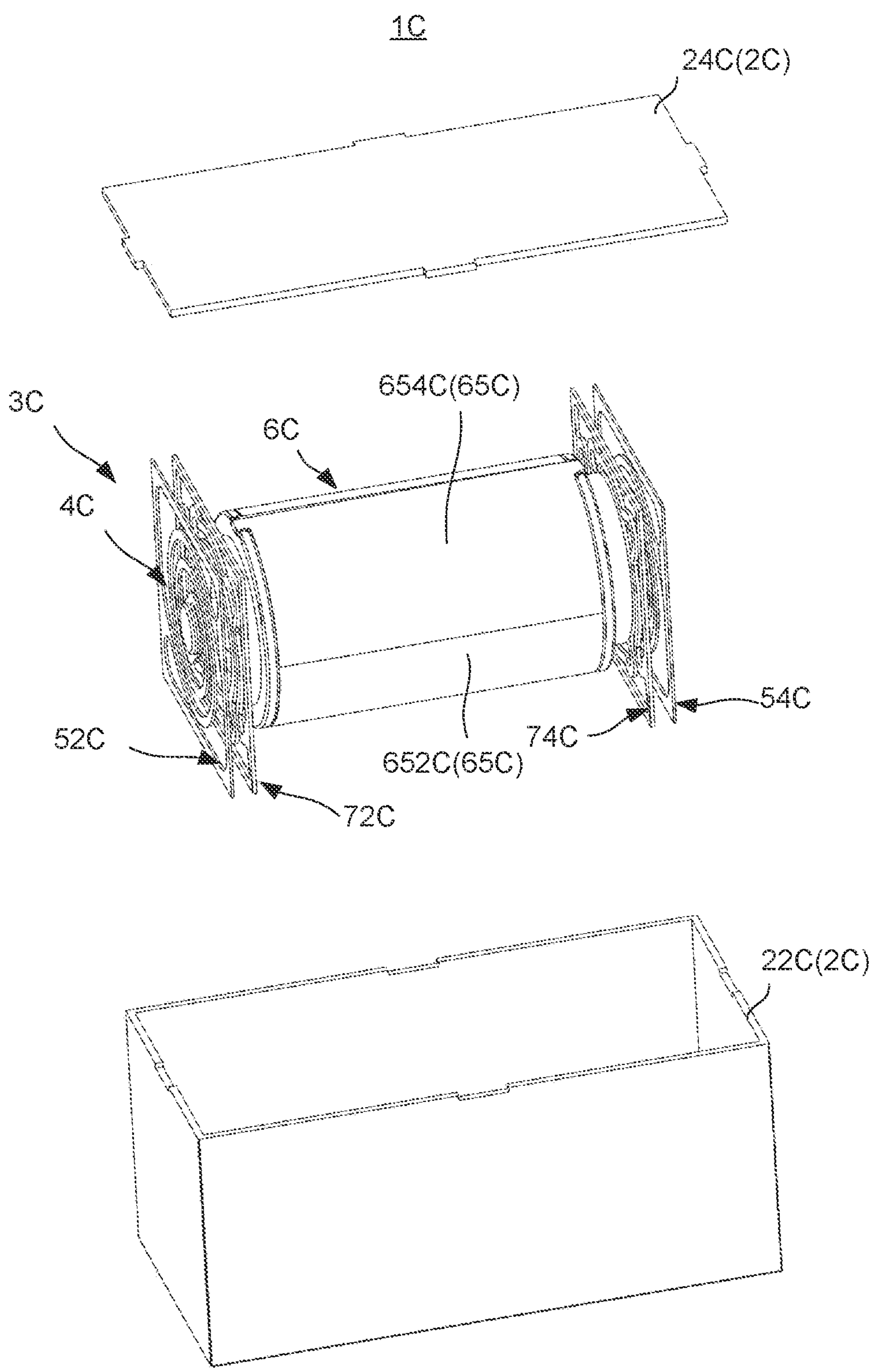
FIG. 23 is an exploded perspective view illustrating modification 3 of the vibration actuator according to the embodiment of the present invention.
Figure 24:
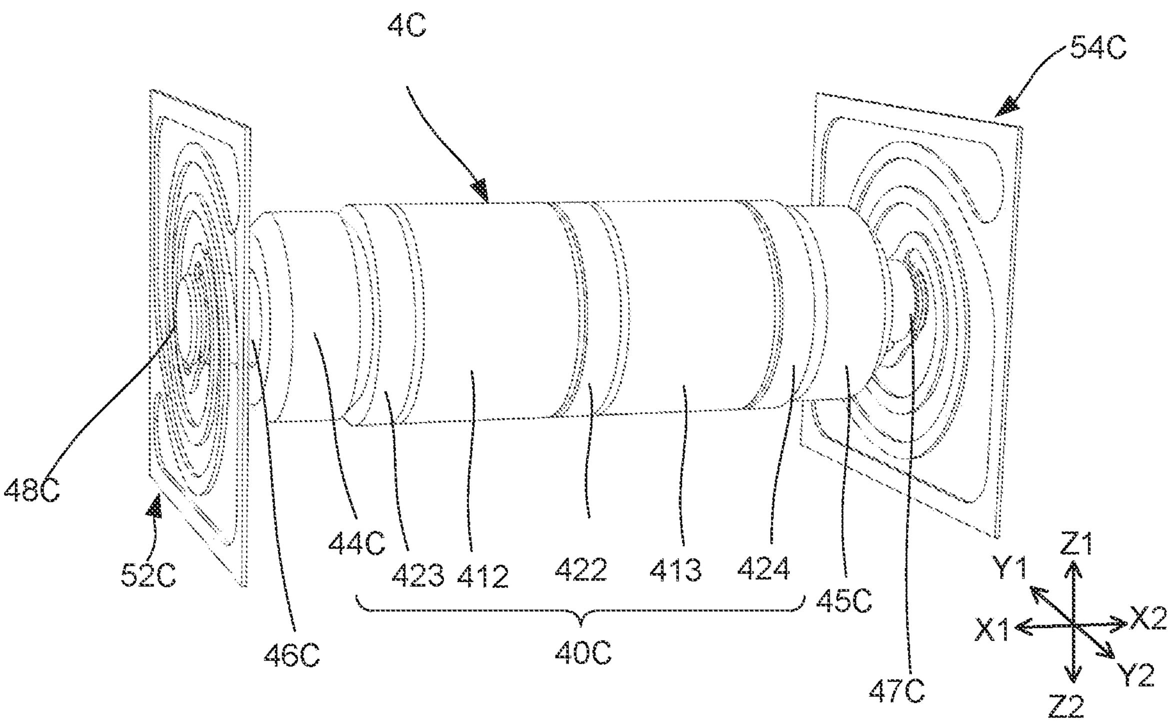
FIG. 24 is a perspective view of a first movable part of modification 3 of the vibration actuator.

FIG. 23 is an exploded perspective view illustrating modification 3 of the vibration actuator according to the embodiment of the present invention, and FIG. 24 is a perspective view of a first movable part of modification 3 of the vibration actuator. In addition, FIG. 25 is a longitudinal sectional view illustrating a configuration of a main part of the vibration actuator of modification 3 of the embodiment of the present invention.

Vibration actuator 1C of modification 3 is different from vibration actuator 1 in shapes of magnet part 40C and coil part 61C, while other components have similar functions, although they may differ in shape. Therefore, only configurations different from those of vibration actuator 1 are described below, and the same configurations are denoted with the same reference numerals and description thereof is omitted. Configurations having substantially the same functions are denoted with C for description.

Vibration actuator 1C is a vibrating member including housing 2C with a cuboid shape composed of plate part 24C and box-shaped housing body 22C, and driving unit 3C housed in housing 2C. Driving unit 3C is different from driving unit 3 in the number of the magnets of first movable part 4C, and the number of the coils of second movable part 6C.

Figure 25:
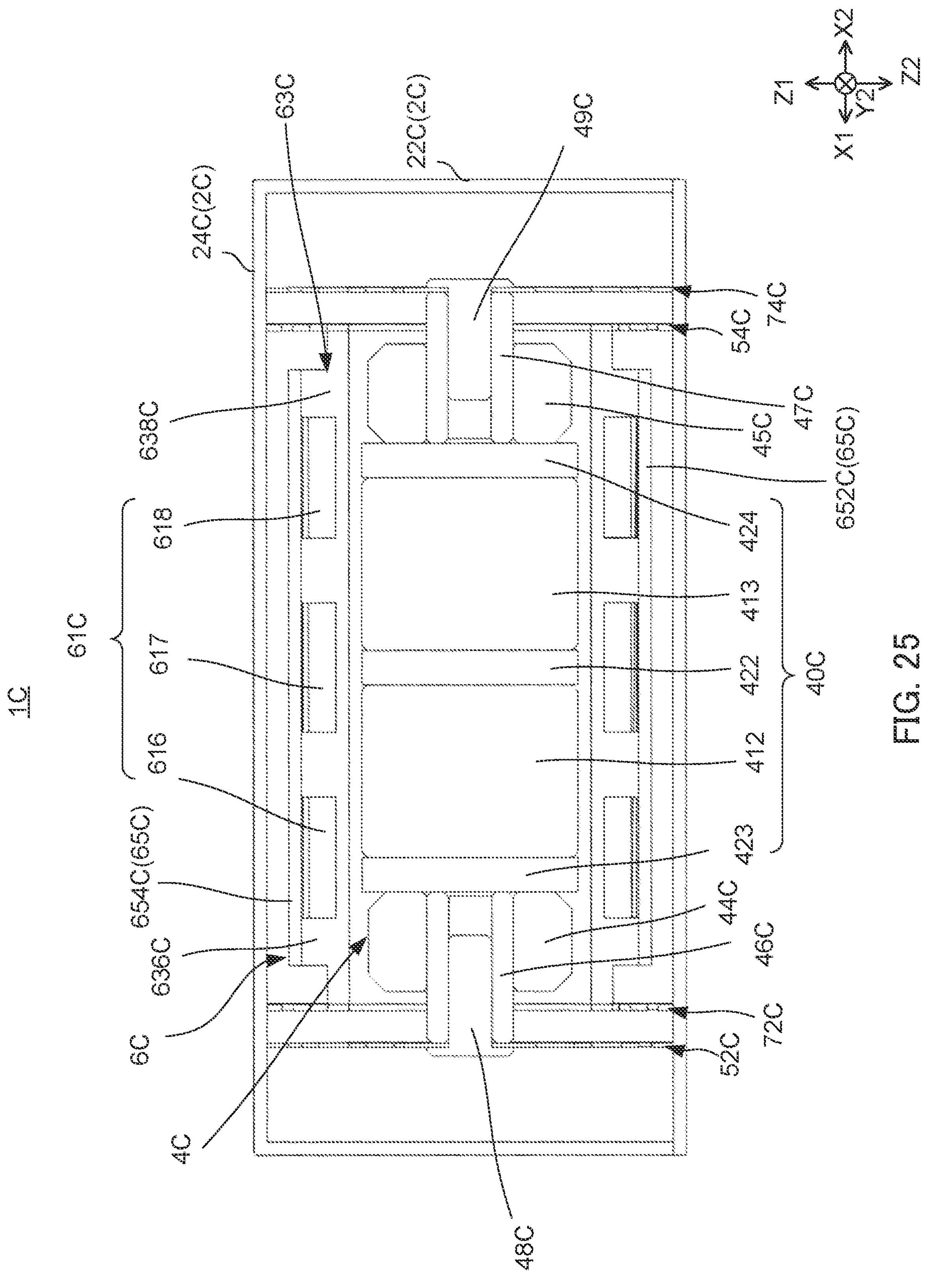
FIG. 25 is a diagram illustrating a configuration of a main part of modification 3 of the vibration actuator according to the embodiment of the present invention.

As illustrated in FIGS. 23 to 25, vibration unit 3C includes first movable part 4C including magnet part 40C, first elastic support parts 52C and 54C, second movable part 6C including coil part 61C, and second elastic support parts 72C and 74C.

First elastic support parts 52C and 54C support first movable part 4C at both end portions in the vibration direction (the X direction) in a movable manner back and forth. Second elastic support parts 72C and 74C support second movable part 6C disposed at the outer periphery of magnet part 40C in a movable manner back and forth at both end portions in the vibration direction (the X direction) on the outer periphery side of magnet part 40C. Driving unit 3C generates vibration by driving first movable part 4C and second movable part 6C through cooperation of energized coil part 61C and magnet part 40C.

First movable part 4C includes magnet part 40C, weight parts 44C and 45C, spring stopper parts 46C and 47C, and spring fixing parts 48C and 49C. In addition, second movable part 6C includes coil part 61C, coil holding part 63C, and outer yoke 65C including divided members 652C and 654C.

In magnet part 40C in first movable part 4C, two magnets 412 and 413 are disposed with the same poles facing each other in the vibration direction with yoke 422 disposed therebetween. In addition, yokes 423 and 424 are integrally provided at end portions in the vibration direction in magnets 412 and 413.

On the other hand, coil part 61C of second movable part 6C is composed of three coils 616, 617 and 618 disposed to surround the peripheries of yokes 422, 423 and 424, and appropriately arranged at coil holding part 63C. In second movable part 6C, coil part 61C is covered with outer yoke 65C provided at the outer surface of coil holding part 63C. Outer yoke 65C is composed of divided members 652C and 654C.

Modification 3 has a configuration with magnet part 40C with the same poles of two magnets 412 and 413 facing each other, and coils 616, 617 and 618 added correspondingly. In this manner, the magnetic force generated in the magnetic circuit can be efficiently generated, and the thrust for vibrating first movable part 4C and second movable part 6C can be increased.

Modification 4

Figure 26:
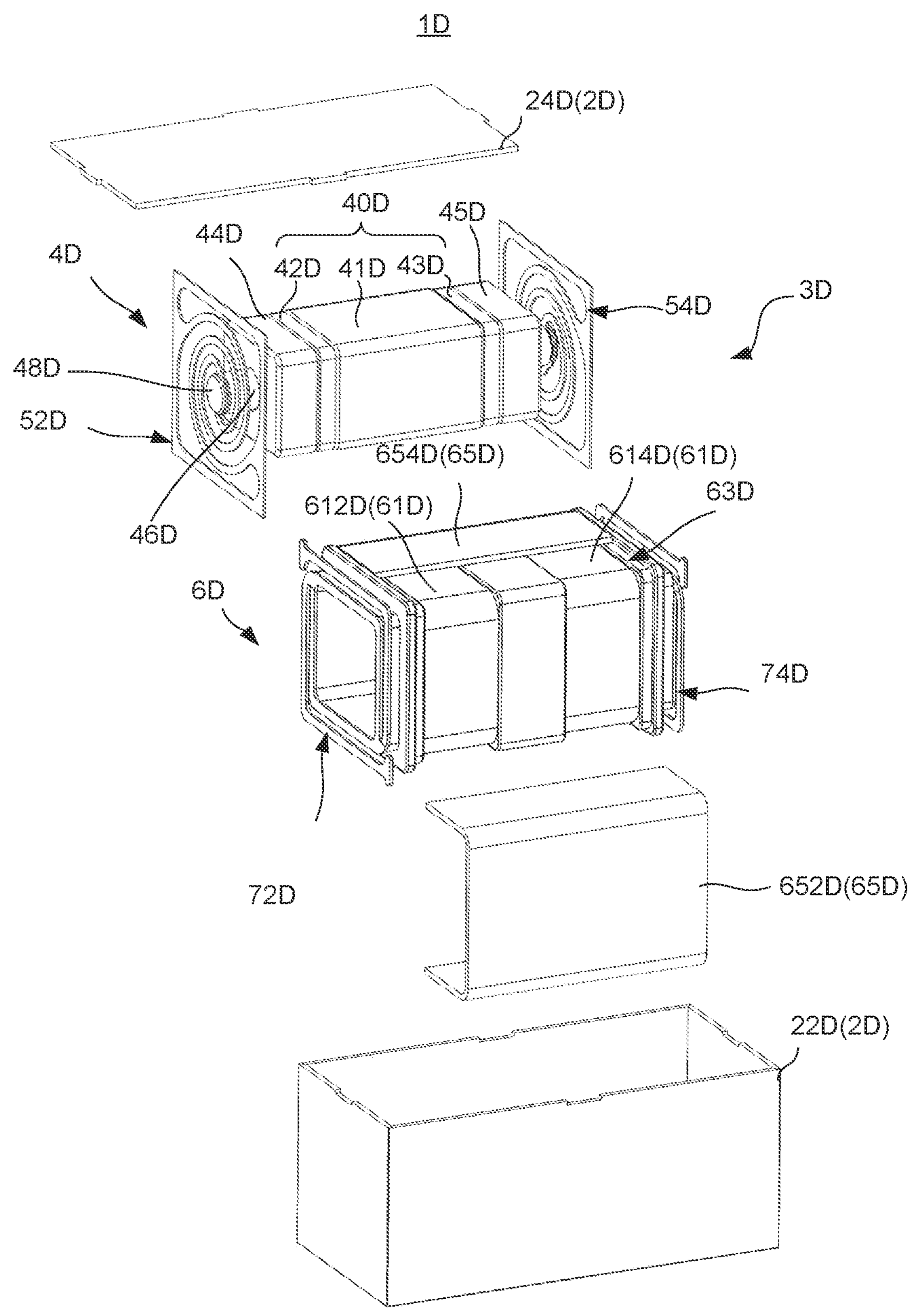
FIG. 26 is an exploded perspective view illustrating modification 4 of the vibration actuator according to the embodiment of the present invention.

FIG. 26 is an exploded perspective view illustrating modification 4 of the vibration actuator according to the embodiment of the present invention. Note that in FIG. 26, the second movable part is illustrated with the divided member of the outer yoke detached for the sake of convenience of description.

Vibration actuator 1D of modification 4 is different from vibration actuator 1 in all components related to the external shape in driving unit 3C. Except for the difference in the shape, other components have the same functions, and as such the components with the same functions and names as those of actuator 1 are denoted with D.

Vibration actuator 1D is a vibrating member including housing 2D with a cuboid shape composed of plate part 24D and box-shaped housing body 22D, and driving unit 3D housed in housing 2D. In vibration actuator 1D, driving unit 3D is formed in a rectangular shape.

In this manner, when housing driving unit 3D in rectangular shape housing 2D, driving unit 3D matching the shape of housing 2D can be disposed at the outer periphery part with no gap. That is, with driving unit 3D matching housing 2D, the volume of driving unit 3D can be maximized, and the propulsion can be increased by effectively using the footprint.

Modification 5

Figure 27:
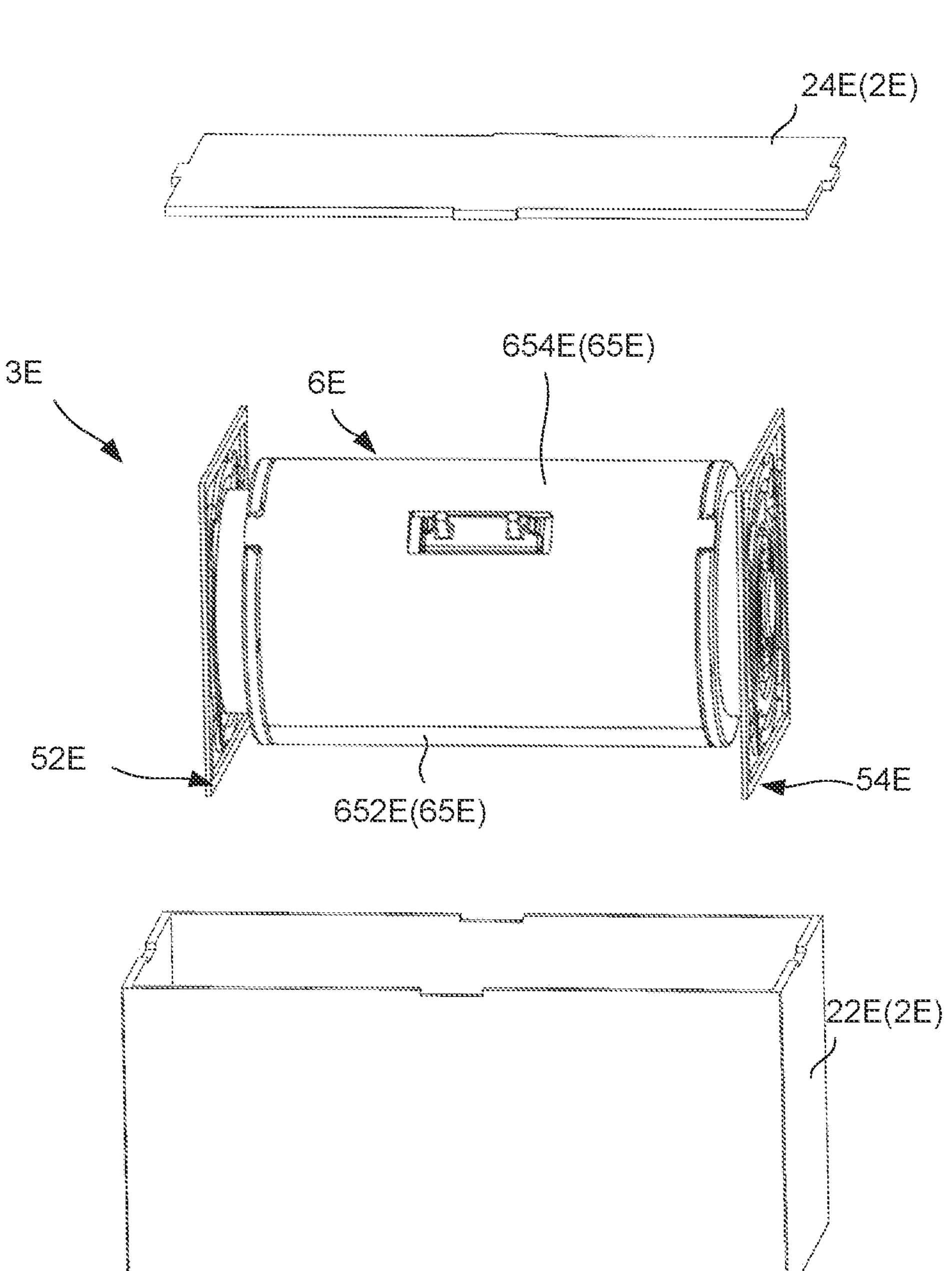
FIG. 27 is an exploded perspective view of a vibration actuator of modification 5 of the embodiment of the present invention.
Figure 28:
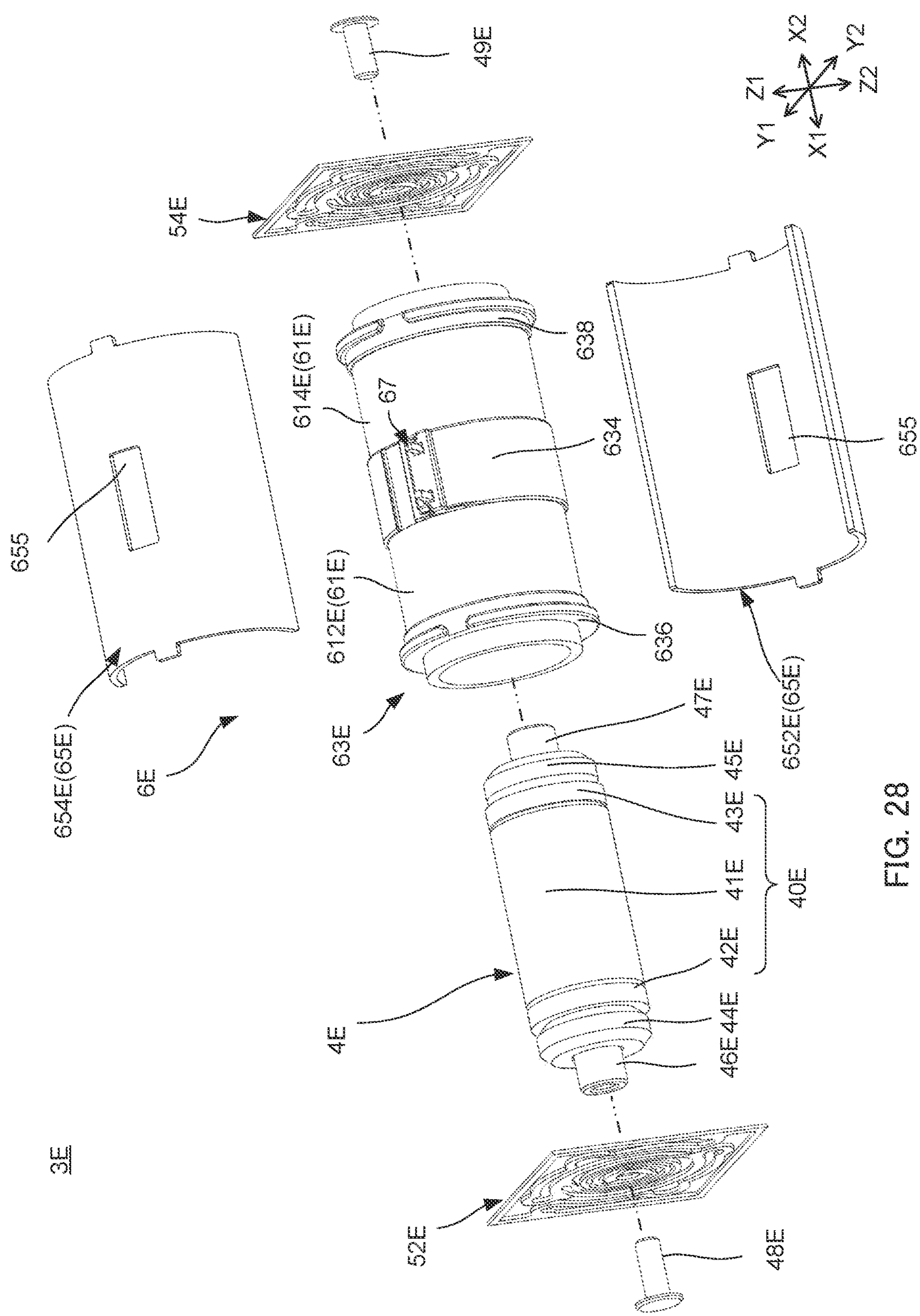
FIG. 28 is a partially exploded perspective view of a driving unit part illustrating a configuration of a main part of modification 5 of the vibration actuator according to the embodiment of the present invention.
Figure 29:
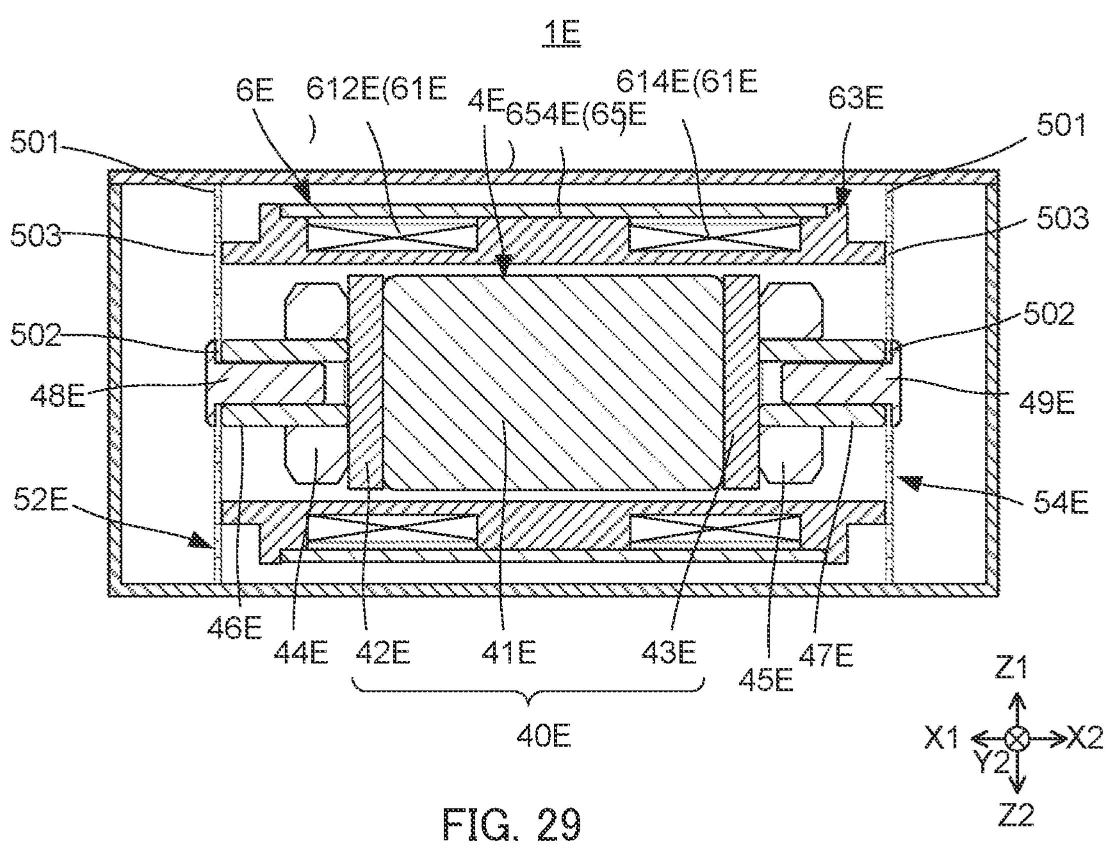
FIG. 29 is a longitudinal sectional view illustrating a configuration of a main part of modification 5 of the vibration actuator according to the embodiment of the present invention.
Figure 30:
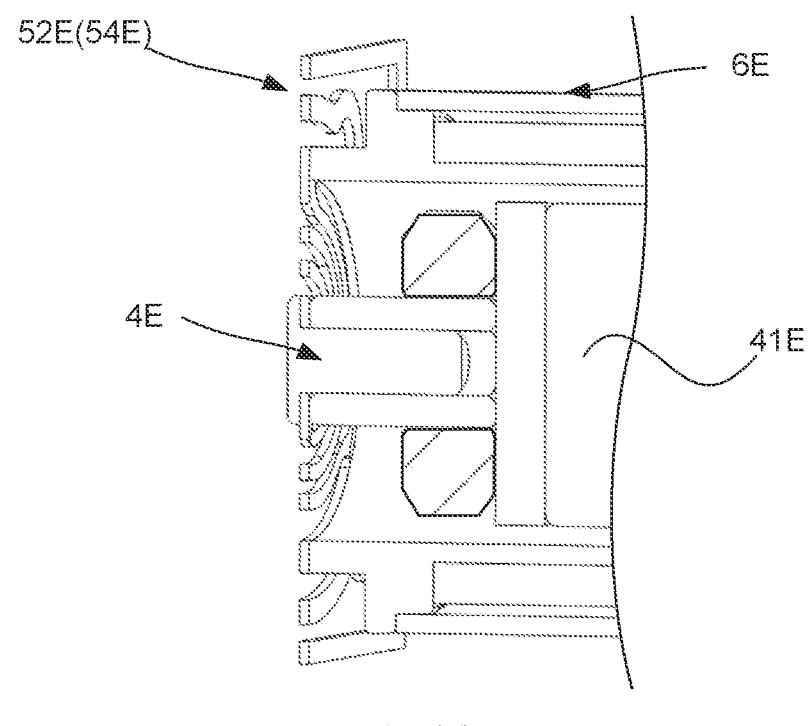
FIG. 30 is a diagram for describing a joining portion of an elastic support part and a movable part of modification 5 of the vibration actuator.

FIG. 27 is an exploded perspective view of a vibration actuator of modification 5 of the embodiment of the present invention, and FIG. 28 is a partially exploded perspective view of a driving unit part illustrating a configuration of a main part of modification 5 of the vibration actuator according to the embodiment of the present invention. In addition, FIG. 29 is a longitudinal sectional view illustrating a configuration of a main part of modification 5 of the vibration actuator according to the embodiment of the present invention, and FIG. 30 is a diagram for describing a joining portion of an elastic support part and a movable part of modification 5 of the vibration actuator.

Vibration actuator 1E of modification 5 is different from vibration actuator 1 in the configurations of first elastic support parts 52E and 54E and second elastic support parts 72E and 74E, while other components have similar functions, although they may differ in shape. Therefore, only configurations different from those of vibration actuator 1 are described below, and the same configurations are denoted with the same reference numerals and description thereof is omitted. Configurations having substantially the same functions are denoted with E for description.

Vibration actuator 1E is a vibrating member including housing 2E with a cuboid shape composed of plate part 24E and box-shaped housing body 22E, and driving unit 3E housed in housing 2E.

Driving unit 3E is different from driving unit 3 in that one elastic support part that supports first movable part 4E and second movable part 6E in a movable manner in the vibration direction is provided and movable parts 4E and 6E are supported by a pair of elastic support parts 52E and 54E at both ends.

As illustrated in FIGS. 27 to 30, vibration unit 3E includes first movable part 4E including magnet part 40E, elastic support parts 52E and 54E, and second movable part 6E including coil part 61E.

Second movable part 6E is disposed on the outer periphery side of first movable part 4E in housing 2E. First movable part 4E includes magnet part 40E, weight parts 44E and 45E, spring stopper parts 46E and 47E, and spring fixing parts 48E and 49E. In addition, second movable part 6E includes coil part 61E, coil holding part 63E, and outer yoke 65E including divided members 652E and 654E.

Elastic support parts 52E and 54E are joined to first movable part 4E and second movable part 6E in a movable manner back and forth at both end portions in the vibration direction (X1 and X2 directions) in housing 2E.

Elastic support parts 52E and 54E have the same shape, with outer periphery fixing part 501 with a rectangular plate shape (for example, a square shape) such that the inner periphery part of outer periphery fixing part 501 is displaceable in the vertical direction with respect to outer periphery fixing part 501.

Elastic support parts 52E and 54E are formed such that they are displaced most toward the center side. Elastic support parts 52E and 54E are provided with first movable part fixing part 502 to which first movable part 4E is joined at the center portion, and second movable part fixing part 503 to which second movable part 6E is fixed at the deformable portion connecting outer periphery fixing part 501 and the center portion on the outer periphery side thereof.

Second movable part fixing part 503 is provided at the intermediate portion between outer periphery fixing part 501 and the center portion, i.e., an elastically-deformable portion interposed between outer periphery fixing part 501 and the center portion (first movable part fixing part 502) in elastic support parts 52E and 54E. Second movable part fixing part 503 is separated from outer periphery fixing part 501 and the center portion on the elastically-deformable portion in elastic support parts 52E and 54E, and thus can be deformed and displaced with respect to them in the vibration direction.

First movable part fixing part 502 and second movable part fixing part 503 are provided with a spacing therebetween so as to be displaceable in the central axis direction of elastic support parts 52E and 54E, i.e., the vibration direction. This spacing ensures the elastic deformation region of the elastically deformable portion between first movable part fixing part 502 and second movable part fixing part 503. In this manner, first movable part 4E and second movable part 6E are supported in a movable manner in the vibration direction at both end portions in the vibration direction through one elastic support parts 52E and 54E.

Note that elastic support parts 52E and 54E may have the same basic configuration as that of first elastic support parts 52, 52A to 52C, 54, 54A to 54C, second elastic support parts 72, 72A to 72C, 74, and 74A to 74C and the like. Driving unit 3E generates vibration by driving first movable part 4E and second movable part 6E through cooperation of energized coil part 61E and magnet part 40E.

In modification 5, both of first movable part 4E and second movable part 6E are supported by the same elastic support parts (leaf spring) 52E and 54E in a movable manner in the vibration direction at both end portions in the vibration direction. Thus, the size reduction can be achieved.

Note that in vibration actuators 1 and 1A, the elastic support part may not be a leaf spring, and may having any configuration.

Modification 6

Figure 31:
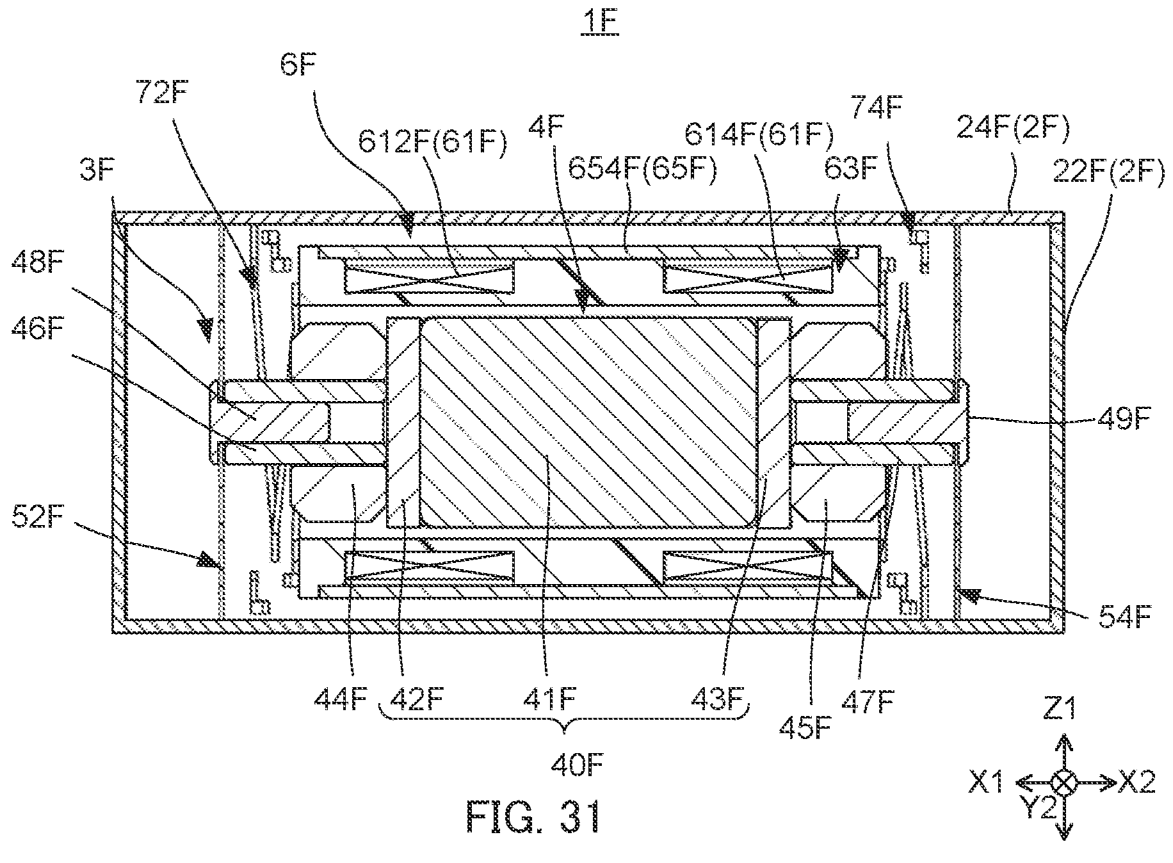
FIG. 31 is a longitudinal sectional view illustrating a configuration of a main part of modification 6 of the vibration actuator according to the embodiment of the present invention.
Figure 32:
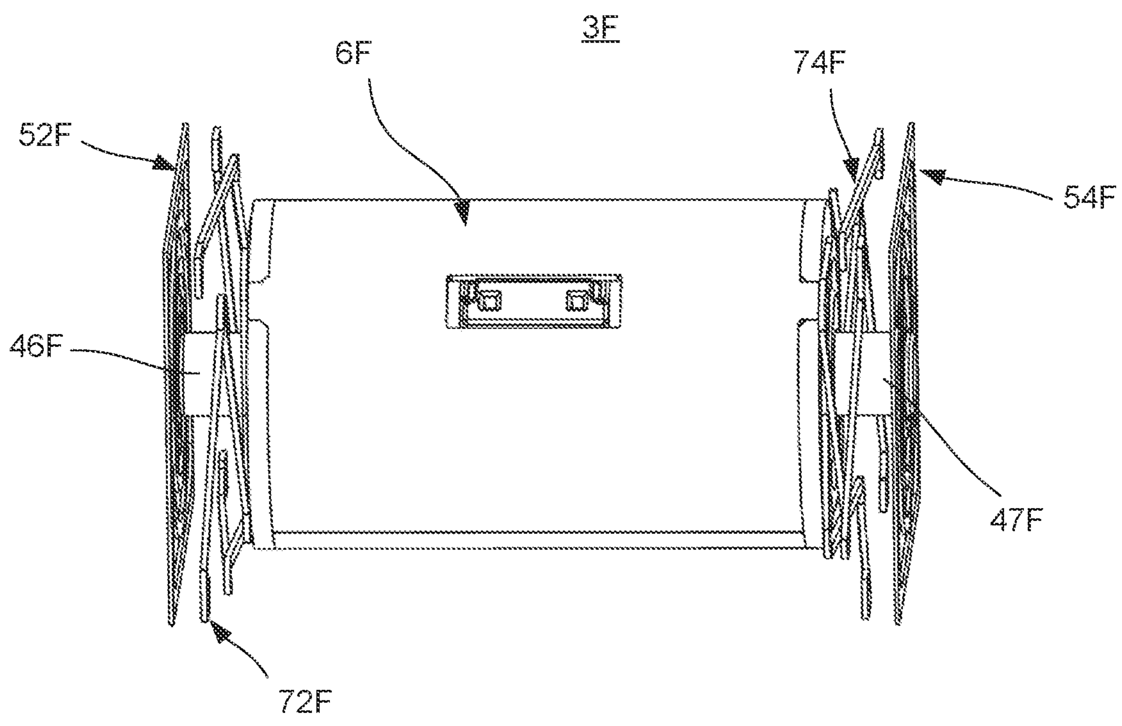
FIG. 32 is a front perspective view of a driving unit of modification 6 of the vibration actuator according to the embodiment of the present invention.
Figure 33:
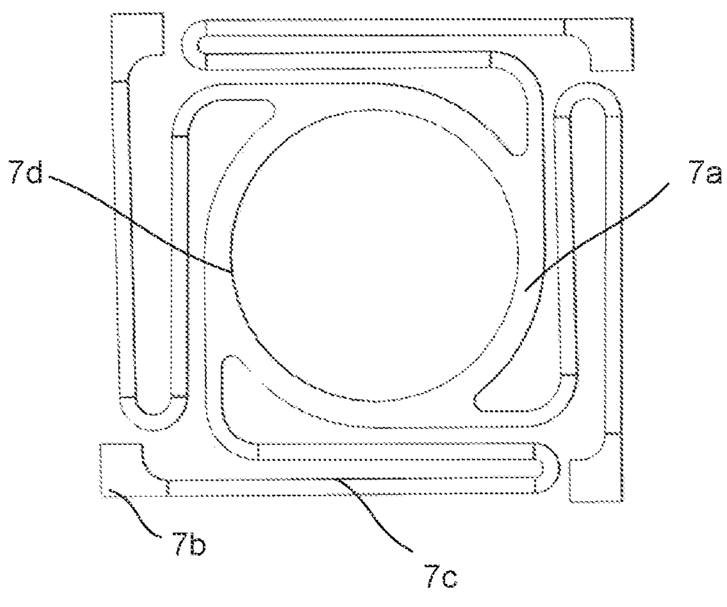
FIG. 33 is a left side view of a second elastic support part of modification 6 of the vibration actuator according to the embodiment of the present invention.
Figure 34:
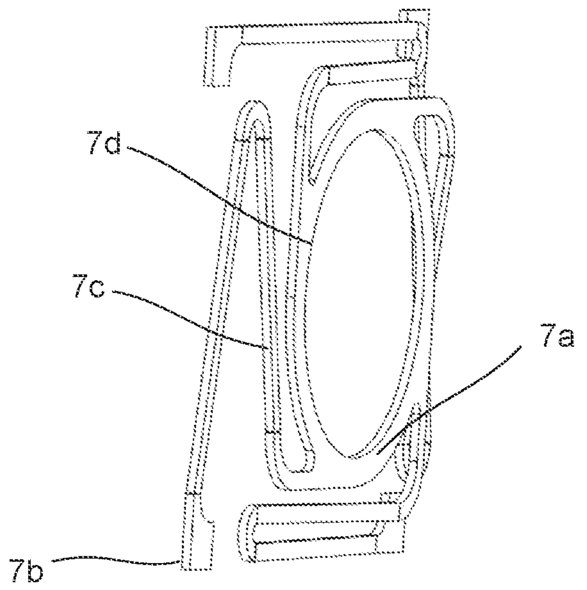
FIG. 34 is a front perspective view of the second elastic support part of modification 6 of the vibration actuator according to the embodiment of the present invention.

FIG. 31 is a longitudinal sectional view illustrating a configuration of a main part of modification 6 of the vibration actuator according to the embodiment of the present invention, and FIG. 32 is a front perspective view of a driving unit of modification 6 of the vibration actuator according to the embodiment of the present invention. FIG. 33 is a left side view of a second elastic support part of modification 6 of the vibration actuator according to the embodiment of the present invention, and FIG. 34 is a front perspective view of the second elastic support part of modification 6 of the vibration actuator according to the embodiment of the present invention.

Vibration actuator 1F of modification 6 is different from vibration actuator 1 of Embodiment 1 in the shape of second elastic support parts 72F and 74F. Other components have similar functions, although they may differ in shape. Therefore, only different configurations are described below, and the same configurations are denoted with the same reference numerals and description thereof is omitted. Configurations having substantially the same functions are denoted with E for description.

Vibration actuator 1F is a vibrating member including housing 2F with a cuboid shape composed of plate part 24F and box-shaped housing body 22F, and driving unit 3F housed in housing 2F.

In comparison with driving unit 3, driving unit 3F has a configuration in which the first elastic support part and the second elastic support part that support first movable part 4F and second movable part 6F in a movable manner in the vibration direction are unified, and movable parts 4F and 6F are supported by a pair of elastic support parts 52F and 54F at both ends.

Vibration unit 3F includes first movable part 4F including magnet part 40F, first elastic support parts 52F and 54F, second movable part 6F including coil part 61F, and second elastic support parts 72F and 74E.

Second elastic support parts 72F and 74F are formed in the same shape, and are elastically deformable in the same manner. As illustrated in FIGS. 33 and 34, second elastic support parts 72F and 74F are formed in a rectangular shape.

At the outer periphery portion, second elastic support parts 72F and 74F are provided with outer fixing part 7*b* fixed to housing 2F. In addition, at the center portion, second elastic support parts 72F and 74Fa are provided with annular inner periphery part 7*a* to which second movable part 6F is joined. Inner periphery part 7*a* includes opening 7*d* to which both end portions of first movable part 4F are inserted.

Inner periphery part 7*a* is connected to outer fixing part 7*b* disposed at the four corners of the flat rectangular plate shape through arm part 7*c* bent and protruded to four sides.

Arm part 7*c* is tilted in the thickness direction of second elastic support parts 72F and 74F, i.e., the vibration direction, and second elastic support parts 72F and 74F are biased in the vibration direction in advance. Second elastic support parts 72F and 74F are configured such that arm part 7*c* is bent and extended in the four directions from inner periphery part 7*a*, and that outer fixing part 7*b* is located at a plane different from inner periphery part 7*a*.

In this manner, second movable part 6F joined to housing 2F through second elastic support parts 72F and 74F can provide a stronger biasing force in the vibration direction than a plate-shaped leaf spring. In this manner, it is possible to increase the amplitude for the movable part supported in a movable manner back and forth.

Magnet part 40 can be changed to magnet parts 40A to 40F together with coil parts 61 and 61A to 61F in vibration actuators 1 to 1F.

The invention made by the inventor has been described specifically based on the above embodiments. The invention is not limited to the above embodiments, but can be modified to the extent not to depart from the gist thereof.

In addition, the vibration actuator according to the present invention may be mounted in the part that makes contact with the user such as game controllers and mobile apparatuses other than mobile terminals (for example, mobile information terminals such as tablet PCs, and mobile game terminals). Specifically, vibration actuator 1 may be mounted in the part that makes contact with the user in hand-carry electric equipment such as mobile terminals and electric beauty equipment such as facial massagers. Vibration actuator 1 may be mounted in the part that makes contact with the user in a wearable terminal worn on the user. In the case of hand-carry electric equipment such as game controllers, the part that makes contact with the user is a handle grabbed by the user, for example. In addition, in the case of wearable electric equipment such as facial massagers, the part that makes contact with the user is a pressing part that exerts a pressure on the user's body surface, for example.

This application is entitled to and claims the benefit of Japanese Patent Application No. 2021-129940 filed on Aug. 6, 2021, the disclosure each of which including the specification, drawings and abstract is incorporated herein by reference in its entirety.

INDUSTRIAL APPLICABILITY

The vibration actuator according to the present invention is suitable as an actuator that is mounted in electronic apparatuses such as game machine terminals and mobile terminals and electric equipment such as electric beauty equipment, and can stably generate various vibration outputs with different frequency bands while reducing the size of the actuator.

REFERENCE SIGNS LIST

- 1, 1A, 1B, 1C, 1D, 1E, 1F, 10 Vibration actuator
- 2, 2A, 2B, 2C, 2D, 2E, 2F Housing
- 3, 3A, 3B, 3C, 3D, 3E, 3F Driving unit
- 4, 4A, 4B, 4C, 4D, 4E, 4F First movable part
- 5*a*, 7*a* Inner periphery part
- 5*b* Outer periphery part
- 5*c* Deformation arm
- 5*d* Connection hole
- 6, 6A, 6B, 6C, 6E, 6E, 6F Second movable part
- 7*b* Outer fixing part
- 7*c* Deformation arm part
- 7*d* Opening
- 22, 22A, 22C, 22D, 22E, 22F Housing body
- 24, 24A, 24C, 24D, 24E, 24F Plate part
- 26, 26A Opening
- 40, 40A, 40B, 40C, 40D, 40E, 40F Magnet part
- 41, 41E, 41F, 412, 413 Magnet
- 42, 42E, 42F, 43, 43E, 43F, 422, 423, 424 Yoke
- 44, 44B, 44C, 44E, 44F, 45, 45B, 45C, 45E, 45F Weight part
- 441, 451 Through hole (Opening)

46, 47, 462, 472 Sleeve (Spring stopper part)
46A, 46B, 46C, 46E, 46F, 47A, 47B, 47C, 47E, 47F Spring stopper part
48, 48B, 48C, 48E, 49, 49B, 4C, 49E Spring fixing part
52, 52A, 52B, 52C, 52E, 52F, 54, 54A, 54B, 54C, 54E, 54F First elastic support part
61, 61A, 61B, 61C, 61D, 61E, 61F Coil part
63, 63B, 63C, 63E, 63F Coil holding part
65, 65B, 65C, 65E, 65F Outer yoke
67 Terminal tying part
72, 72A, 72B, 72C, 72E, 72F, 74, 74A, 74B, 74C, 74E, 74F Second elastic support part
464, 474 Auxiliary sleeve
501 Outer periphery fixing part
502 First movable part fixing part
503 Second movable part fixing part
612, 612E, 612F, 614, 614E, 614F, 616, 617, 618 Coil
632 Cylindrical body part
634 Center flange part
636, 636B, 638B End flange part
639 Groove
652, 652B, 652C, 652E, 654, 654B, 654C, 654E, 654F Divided member
65 Divided member body
656 Opening
672 Portion
4101 Front surface
4102 Rear surface
6362, 6362B, 6382, 6382B Guide

The invention claimed is:

1. A vibration actuator comprising:

a housing;

a first movable part including a magnet part, and disposed in a movable manner back and forth in a vibration direction along an axis direction in the housing through a first elastic support part joined at both end portions of the magnet part in the axis direction; and a second movable part including a coil part disposed coaxially with the magnet part so as to surround the magnet part, the second movable part being disposed in a movable manner back and forth in the vibration direction in the housing at an outer periphery of the first movable part through a second elastic support part joined at both end portions of the coil part in the axis direction, wherein vibration is generated by driving the first movable part and the second movable part through energization to the coil part, and wherein the both end portions of the first movable part are inserted through the second elastic support part and located at positions protruded to outside of the both end portions of the second movable part in the vibration direction so as to be joined to the first elastic support part.

2. The vibration actuator according to claim 1, wherein the first movable part and the second movable part are simultaneously driven and moved.

3. The vibration actuator according to claim 1, wherein the first elastic support part includes a plurality of spring members attached to the both end portions of the first movable part with a spacing between the plurality of spring members in the axis direction such that the first movable part is movable back and forth in the axis direction.

4. The vibration actuator according to claim 1, wherein the first elastic support part and the second elastic support part are the same elastic support part, and wherein the same elastic support part supports each of the first movable part and the second movable part such that the first movable part and the second movable part are separately movable back and forth through elastic deformation.

5. The vibration actuator according to claim 1, wherein the magnet part includes one magnet and a yoke provided at both end surfaces of the magnet in an axis direction, and the coil part includes a pair of coils disposed at a position surrounding each yoke.

6. The vibration actuator according to claim 1, wherein the magnet part includes two magnets disposed with the same poles facing each other, and wherein the coil part includes one coil disposed at a position surrounding a portion where the two magnets face each other.

7. The vibration actuator according to claim 1, wherein the both end portions of the first movable part include a pair of spring stopper parts disposed to protrude to outside of both end portions of the second movable part in the vibration direction from both sides of the magnet part in the axis direction, and joined to the pair of first elastic support parts.

8. The vibration actuator according to claim 1, wherein the second movable part includes an outer yoke surrounding the coil part.

9. The vibration actuator according to claim 1, wherein a first resonance frequency of a first vibration system including the first movable part and the first elastic support part is smaller than a second resonance frequency of a second vibration system including the second movable part and the second elastic support part.

10. The vibration actuator according to claim 9, wherein the first movable part and the second movable part move back and forth in the same phase in a band between the first resonance frequency and second resonance frequency.

11. The vibration actuator according to claim 1, wherein the first movable part includes a weight part fixed to both sides of the magnet part in the axis direction.

12. The vibration actuator according to claim 11, wherein the weight part is an annular member including an opening at a center, and wherein a pair of spring stopper parts joined to the weight part at the opening, disposed to protrude to outside of the second movable part in the vibration direction, making up the both end portions, and joined to the first elastic support part is provided.

* * * * *